United States Patent [19]
Wang et al.

[11] Patent Number: 5,236,595
[45] Date of Patent: * Aug. 17, 1993

[54] METHOD AND APPARATUS FOR FILTRATION WITH PLURAL ULTRAVIOLET TREATMENT STAGES

[75] Inventors: Lawrence K. Wang, Latham, N.Y.; Lubomyr Kurylko, New Providence, N.J.; Mu H. S. Wang, Latham, N.Y.

[73] Assignee: International Environmental Systems, Inc., USA, Latham, N.Y.

[*] Notice: The portion of the term of this patent subsequent to Mar. 2, 2010 has been disclaimed.

[21] Appl. No.: 908,297

[22] Filed: Jul. 2, 1992

Related U.S. Application Data

[63] Continuation-in-part of Ser. No. 549,596, Jul. 6, 1990, Pat. No. 5,190,659.

[51] Int. Cl.$^5$ ............................................. C02F 9/00
[52] U.S. Cl. ..................................... 210/669; 55/315; 210/141; 210/188; 210/192; 210/258; 210/259; 210/703; 210/806; 422/186.3; 96/142; 96/136
[58] Field of Search .................. 210/87, 90, 97, 103, 210/104, 108, 143, 134, 135, 188, 195.1, 202, 205, 206, 221.2, 248, 232, 192, 193, 254, 256, 257.1, 258, 259, 260, 265, 275, 276, 294, 295, 323.1, 340, 411, 416.1, 420, 425, 500.1, 513, 519, 531.1, 539, 540, 631, 662, 663, 669, 703, 704, 705, 718, 741, 748, 744, 750, 791, , 798, 916, 804, 806

[56] References Cited

U.S. PATENT DOCUMENTS

| | | | |
|---|---|---|---|
| 103,280 | 5/1870 | Barrows | 210/425 |
| 619,838 | 2/1899 | Potter | 210/764 |
| 2,993,599 | 7/1961 | Moon et al. | 210/675 |
| 3,064,816 | 11/1962 | Griswold | 210/193 |
| 4,082,664 | 4/1978 | Lindstol | 210/333.1 |
| 4,377,485 | 3/1983 | Krofta | 210/704 |
| 4,391,704 | 7/1983 | Anderson | 210/188 |

(List continued on next page.)

FOREIGN PATENT DOCUMENTS 0000842 of 1870 United Kingdom ................ 210/425

OTHER PUBLICATIONS

G. David Waltrip & Edwin G. Snyder "Elimination of odor at six major wastewater treatment plants", Journal WPCF, vol. 57, #10, Published Oct. 1985.

(List continued on next page.)

Primary Examiner—Joseph W. Drodge

[57] ABSTRACT

An improved filtration system involving the use of ultraviolet irradiation, ozonation, chlorination, reactive filtration media, chemical treatment, compressed air aeration, air emission control, and central flow control is described. The process system and apparatus of the present invention mainly include a liquid pump, an ultraviolet pretreatment means, a central flow control, an air emission control means, a reactive pressure filter, a process tank, at least one chemical feeder means, an ultraviolet post-treatment means, and an aeration means. The filter media are of reactive type, including diatomaceous earth, granular activated carbon, fibrous activated carbon, granular metal medium, greensand, neutralizing sand, silica sand, activated alumina, ion exchange resins, polymeric adsorbents, chemical treated adsorbents, manganese oxide, coal, porous plastic medium, porous stainless steel medium, porous ceramic medium, bacteriostatic filter medium, porous paper filter medium, porous carbon filter medium, coalescing filter medium, fiberglass filter medium, or combinations thereof. The process tank contains and handles regenerating chemicals, flocculating chemicals, filter aids, or recirculating water. The reactive filter media of this invention are regenerated by either chemical reactions or aeration for reuse to prolong the filter media's service life and to reduce the operation and maintenance costs. Said air emission control means is provided when compressed air aeration is applied to said pressure filter for regeneration of said reactive filter media. The apparatus of this invention is compact and simple, and can cost-effectively remove suspended, dissolved, volatile, radioactive and living contaminants from a contaminated liquid.

19 Claims, 13 Drawing Sheets

DESORPTION

U.S. PATENT DOCUMENTS

| | | | |
|---|---|---|---|
| 4,430,220 | 2/1984 | Litzenburger | 210/333.1 |
| 4,626,345 | 12/1986 | Krofta | 210/104 |
| 4,626,346 | 12/1986 | Hall et al. | 210/110 |
| 4,642,192 | 2/1987 | Heskett | 210/638 |
| 4,673,494 | 6/1987 | Krofta | 210/202 |
| 4,673,498 | 6/1987 | Swinney et al. | 210/275 |
| 4,857,198 | 8/1989 | Meidl | 210/631 |
| 4,894,162 | 1/1990 | Cournoyer et al. | 210/631 |
| 4,973,404 | 11/1990 | Weber et al. | 210/193 |
| 5,049,320 | 9/1991 | Wang et al. | 261/122.1 |
| 5,064,531 | 11/1991 | Wang et al. | 210/96.1 |
| 5,069,783 | 12/1991 | Wang et al. | 210/260 |
| 5,084,165 | 1/1992 | Wang et al. | 210/260 |
| 5,122,165 | 6/1992 | Wang et al. | 55/51 |
| 5,122,166 | 6/1992 | Hyrcyk et al. | 210/631 |
| 5,126,050 | 6/1992 | Irvine et al. | 210/631 |
| 5,167,806 | 12/1992 | Wang et al. | 210/195.1 |
| 5,190,659 | 3/1993 | Wang et al. | 210/192 |

OTHER PUBLICATIONS

Wang, L. K., "Using Air Flotation and Filtration in Color and Giardia Removal," Technical Report No. PB89–148398/AS, the U.S. Dept. of Commerce, National Technical Information Service, Springfield, Virginia (Oct. 1988).

Wang, L. K. and M. H. S. Wang, "Advanced Precoat Filtration and Competitive Processes for Water Purification," Technical paper presented at the Harvard Club, Harvard University, Boston, Mass. (23 p., Jan. 28, 1989).

Wang, L. K. "Design and Specifications of Pittsfield Water Treatment System Consisting of Air Flotation and Sand Filtration" Water Treatment, vol. 6, pp. 127–146, 1991.

Wang, L. K. "Reduction of Color, Humic Acid, and Toxic Substances by Adsorption, Flotation and Filtration" Water Treatment, vol. 7, pp. 1–16, 1992.

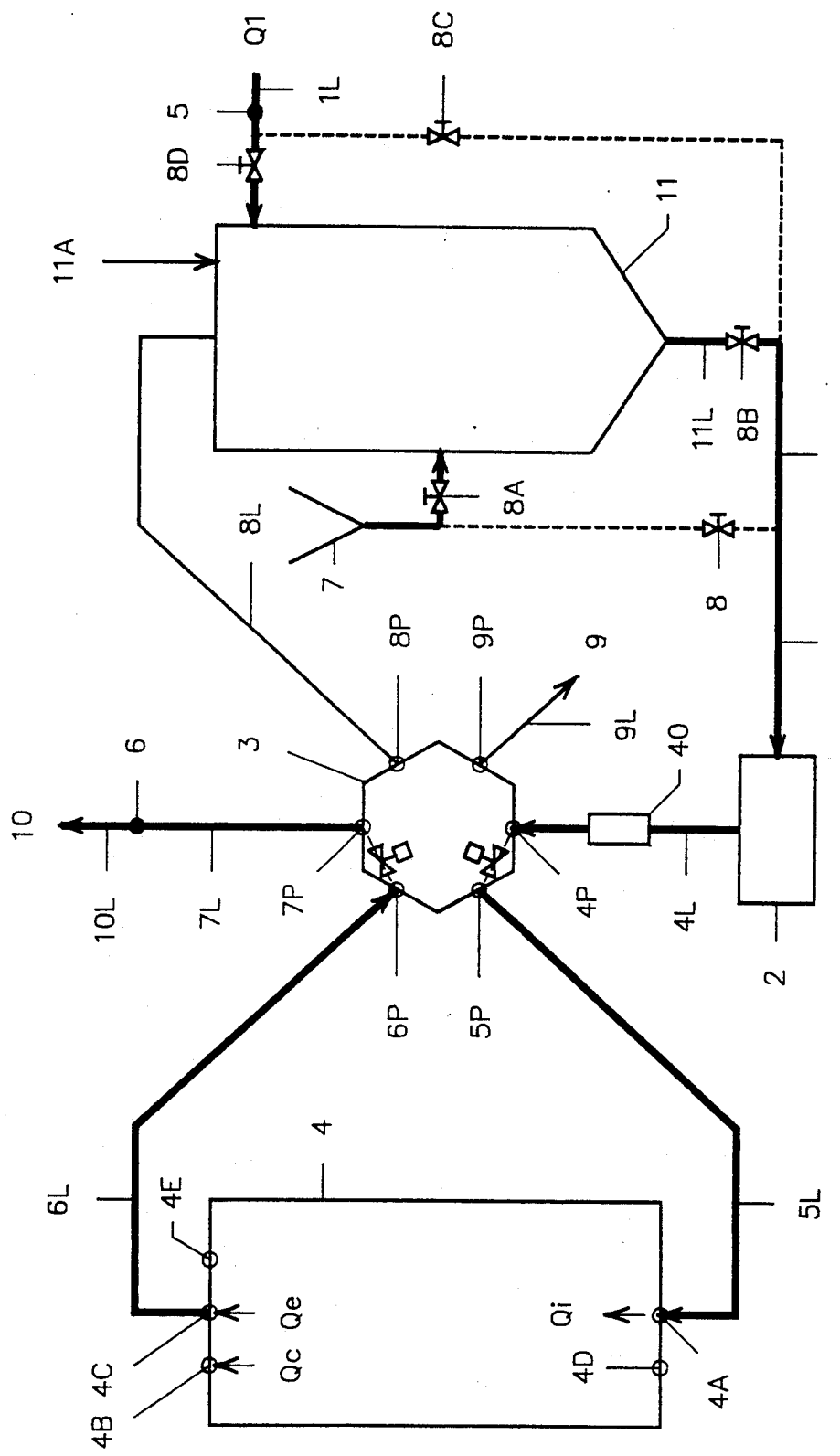
FIG. 2   FILTRATION

BACKWASH

FLUSHING

DESORPTION

METHOD AND APPARATUS FOR FILTRATION WITH PLURAL ULTRAVIOLET TREATMENT STAGES

This is a continuation-in-part of U.S. application Ser. No. 07/549,596, filed Jul. 6, 1990, now U.S. Pat. No. 5,190,659 issued Mar. 2, 1993.

BACKGROUND OF THE INVENTION

1. Field of the Invention

The present invention relates to a reactive filtration apparatus and process for removal of living, suspended, soluble, volatile and radioactive contaminants from a contaminated liquid. Specifically, the filtration apparatus and process of this invention involves mainly the use of reactive filtration media, an ultraviolet irradiation means, chemical treatment means, pump means, an aeration means, an air emission control means, a central flow control, a pressure filter and a process tank.

2. Description of the Prior Art

There are two types of conventional granular media filters: slow sand filters and rapid sand filters. Neither conventional filter can remove any radioactive radon, volatile trihalomethane, living pathogenic bacteria, or soluble hardness and metals. A typical conventional slow sand filter is commonly operated at below 0.16 gpm per square foot, using unstratified non-reactive sands with an effective size of 0.3 mm to 0.35 mm and a uniformity coefficient of 2 to 3. Aside from the low hydraulic load, conventional slow sand filters appear to lack the technological sophistication of their successors, conventional rapid sand filters which are operated at 2 gpm per square foot or higher, using stratified non-reactive sands with an effective size of 0.45 mm and higher and an uniformity coefficient of 1.5 or lower. Both types of conventional filters have operation and maintenance problems. Ordinarily the surface of a partially dewatered slow sand filter bed is raked after about 2 weeks of filter run, and again a week or so later to break through the surface accumulations. At the end of a month, the top portion up to 2 inches of the slow sand bed and the surface accumulations must be scraped off for disposal. Conventional rapid sand filters are superior to conventional slow sand filters for water filtration, but are comparatively more complicate, and can only be operated by experienced operators.

Furthermore, both conventional slow sand filters and conventional rapid sand filters remove only suspended particulates from water. Radioactive contaminants, such as radon gas, and soluble contaminants, such as iron, manganese heavy metals, volatile organic compounds, and hardness can not be removed by any conventional sand filters.

Recently, the design of granular media filters has been advanced to include granular activated carbons, activated alumina, anion exchange resins and cation ion exchange resins for removal of soluble contaminants. Other state-of-the-art processes for water purification include reverse osmosis, electrodialysis, packed column, ultrafiltration, microfiltration, diatomaceous earth filtration, flotation-filtration, etc. The common problems for the state-of-the-art as well as conventional filters are their high cost and time-consuming procedures for operation and regeneration.

There has been no ideal process or apparatus developed for removal of radioactive radon gas from a contaminated liquid.

The present invention adopts both reactive filter media and non-reactive filter media for specific chemical reaction and liquid-solid separation, and adopts at least one central flow control means for the ease of routine water treatment. The present invention's apparatus is compact, and its process is simple and cost-effective, and removes suspended, dissolved, volatile, radioactive, and living contaminants from a contaminated liquid, such as surface water or groundwater. The reactive filter media of this invention are regenerated by liquid chemical solutions or compressed air aeration depending upon the liquid purification applications.

None of the prior arts including Barrows (U.S. Pat. No. 103,280; 5/1870), Potter (U.S. Pat. No. 619,838, 2/1899), Moon et al (U.S. Pat. No. 2,993,599, 7/1961), Griswold (U.S. Pat. No. 3,064,816, 11/1962), Lindstol (U.S. Pat. No. 4,082,664, 4/1978), Litzenburger (U.S. Pat. No. 4,430,220, 2/1984), Hall et al (U.S. Pat. No. 4,626,346, 12/1986), Heskett (U.S. Pat. No. 4,642,192, 2/1987), Swinney et al (U.S. Pat. No. 4,673,498, 6/1987), Krofta (U.S. Pat. No. 4,377,485, 3/1983; No. 4,626,345, 12/1986; 4,673,494, 6/1987), Weber et al (U.S. Pat. No. 4,973,404, 11/1990), and Wand et al (U.S. Pat. No. 5,064,531, 11/91; No. 5,069,783, 12/91) relate to the use of ultraviolet light, reactive granular filter media, chemical regeneration, aeration regeneration, central flow control, and special hydraulic flow pattern in combination for water purification and air emission control as in the case of this present invention.

None of the aforementioned prior arts can remove radon form a contaminated liquid. Conventional crossflow separation processes include reverse osmosis, ultrafiltration, microfiltration and gas permeation which are all membrane processes, and cannot remove radioactive contaminants. The present invention relates to a central controlled crossflow reactive water filtration process in which the filter media are regenerative with ultraviolet, ozone, hydrogen peroxide, hypochlorite, permanganate, and by which radioactive, living and non-living contaminants are efficiently removed under a pressurized hydraulic condition for a prolonged filter run.

All conventional granular media filtration processes adapt either an upflow or a down-flow hydraulic operation during which the direction of influent flow is parallel with the flow path of granular media filtration. In the case of the present invention's crossflow reactive filtration process, the direction of influent flow is perpendicular to the flow path of granular media filtration.

Non-reactive filtration processes remove mainly suspended particulates from water. A reactive filtration process, as in the case of the present invention removes dissolved, volatile, radioactive and living contaminants in addition to its capability for suspended particulates removal.

The major advantages of the present invention over conventional filtration processes include: (a) pretreatment and/or post-treatment of reactive filtration with ultraviolet, ozonation, hydrogen peroxide, permanganate, and dry hypochlorite for total destruction of living contaminants; (b) adoption of a central flow control for the ease of nine water filtration operations: normal filtration, backwash, bypass, flushing, chemical preparation, recirculation, rinse, precoat, and desorption; (c) adoption of both reactive and non-reactive filter media for removal of suspended, dissolved, volatile, radioactive and/or living contaminants; and (d) adoption of an aeration means for the in-apparatus regeneration of reactive filter media. Both total removal of volatile, radioactive and living contaminants and simple central control operation make the present invention extremely attractive to the single families and small institutions for their point-of-entry (POE) in-house operations.

The similarities and dissimilarities between the present invention and the selected important prior arts are further described below.

British Patent No. 842, issued to Chemesha et al in March, 1870 is of interest in citing "safety valves", which are now required for any pressure systems including the present invention. While the safety valves and pipes are the required parts of the present invention, they are not considered to be major components of the present invention which places emphasis on a central controlled reactive and regenerative filtration process.

All Krofta processes (U.S. Pat. Nos. 4,377,485, 4,626,345 and 4,673,494) are similar to a flotation-filtration system described by Wang (U.S. Dept. of Commerce, NTIS Report PB89-158398/AS, October, 1988; Water Treatment, p. 127–146, 1991; Water Treatment, p. 1–16, 1992). While the flotation-filtration process is feasible for removal of color, trihalomethane precursors and Giardia Cysts, the flotation-filtration process system involves the use of too many valves and treatment steps, and thus can only be adopted by municipalities which have skilled operators. The treatment steps of a flotation-filtration system include: chemical mixing, chemical flocculation, dissolved air flotation, non-reactive sand filtration, and chlorination, which are different from the present invention.

Advanced Wang process (U.S. Pat. Nos. 5,064,531 and 5,069,783, issued to Lawrence K. Wang et al in 1991) which are specifically developed for large municipalities, do not relate to air emission control and radon removal.

Filtration apparatus which adopt multi-port control values for feeding filter aids are shown in U.S. Pat. No. 3,064,816 issued Nov. 20, 1962 to David E. Griswold and in U.S. Pat. No. 4,973,404 issued Nov. 27, 1990 to Roland E. Weber, John J. Pavlovich and Lawrence K. Wang. Both filtration apparatus (U.S. Pat. Nos. 3,064,816 and 4,973,404) involve the use of too many valves and non-reactive and non-regenerative granular filter media, for removal of suspended contaminants. The present invention involves the use of only one or two central flow controls (depending upon the hydraulic capacities) and reactive/regenerative filter media in conjunction with ultraviolet irradiation and air emission control means for removing suspended, dissolved, volatile, radioactive and living contaminants.

A prior filtration apparatus using multiport valves for cleaning of filters and delivering adequate pressure is described in U.S. Pat. No. 103,280, issued May 24, 1870 to Thomas Barrows. Barrows' patent is particularly directed to a non-reactive, non-regenerative pressure filter using several three-way valves. Although Barrows' apparatus can be operated horizontally or vertically, it is not a crossflow separation process in accordance with the state-of-the-art engineering definition. Currently only the membrane processes (reverse osmosis, microfiltration, ultrafiltration, and gas permeation) are designed and classified as crossflow separation processes in which the influent water (Qi) is fed to an inlet of said apparatus at one end traveling in parallel with the membrane filtration medium; its concentrate (Qc) is discharged in small volume at the opposite end; and the filter effluent (Qe=Qi−Qc) passing through the membrane filter medium is discharged from the second outlet also at the opposite end of said apparatus. The present invention partially relates to a crossflow granular filtration process and apparatus in which the filter media (instead of membrane filter medium) is reactive/regenerative (instead of non-reactive/non-regenerative), and one central flow control means has nine operational modes (instead of several three-way valves).

Still another apparatus for filtering water through porous media is shown in U.S. Pat. No. 619,838, issued Feb. 21, 1899, to Zoroaster F. Potter. Specifically, Potter's patent relates to a filtration apparatus comprising a chemical process tank coupled to a chemical feed system, an old central flow control valve with a handle for dialing and handling limited water flows only, a pressure filter containing non-reactive/non-regenerative granular filter media, an influent inlet, product liquid discharge pipe, waste drain, many multiple on-off ports, all connected with a piping system which contains a plurality of safety valves. The process of the present invention relates to a pressurized crossflow filtration using reactive/regenerative filter media, and using ultraviolet, ozone, hydrogen peroxide, permanganate, flocculants and hypochlorite as pretreatment chemical and/or post-treatment chemical. The apparatus of the present invention comprises a process tank coupled to a chemical feed system for liquid pretreatment and filter media regeneration (instead of feeding chemical only as in the case of Potter's patent), a modern central flow control means with nine process operational modes to handle water flows, desorption gas, and filter media slurry (instead of limited operational modes and handling only water flows), a pressure filter containing reactive/regenerative filter media (instead of non-reactive/non-regenerative granular filter media), an air emission control means (instead of no air emission control), an influent liquid pipe, effluent discharge pipes and a waste drain, all connected to the modern central flow control means (instead of all connected with a piping system). Besides, simplicity in operation is the major improvement of the present invention, because multiple on-off valves are grouped together and there is an aeration means for in-apparatus regeneration of reactive filter media for reuse.

Still another prior filtration apparatus for automatic flow control is shown in U.S. Pat. No. 2,993,599 issued Jul. 25, 1961 to John J. Moon and Harold M. Hawkins. Their patent discloses a new control technology for automation of a precoat filtration process involving the use of a cycle timer, air inlets, air vents, wash solvent lines, sluice solvent lines, a precoat mix tank, a pressure filter, a filter feed line, an effluent line, a wash recycle line, a wash vapor receiver, drains, a filter cake discharge line, a pressure pump, safety valves, pressure gauges, flow meters, over 20 flow control valves, and a turbidity monitor. The apparatus of the present invention also comprises a pressure filter, a filter feed line, an effluent line, a recycle line, drains, a pressure pump, pressure gauges, a flow meter, a safety valve, and a tank. However, in the case of the present invention, the major improvements are: one central flow control means (instead of over 20 valves), one multi-purpose process tank (instead of one single-purpose tank just for precoating), one pressure filter containing reactive/regenerative filter media (instead of non-reactive/non-regenerative granular filter media), being operated as rotating crossflow hydraulic pattern horizontally or vertically (instead of non-crossflow hydraulic pattern), and having adequate pretreatment and post-treatment for removal of living, non-living, radioactive, suspended and dissolved contaminants (instead of having no pretreatment and no post-treatment for removal of mainly non-living suspended contaminants), all aiming at simplicity in operation and high efficiency in water purification. In addition, the present invention's apparatus does not require complicated automation when applied to single families and small institutions because of its one central flow control operation. For municipal applications, the present invention is automated mechanically and electrically (instead of electronically as in the case of Moon et al) again because of its simple central flow control operation.

A method for treating fluid to remove undesirable constituents contained therein such as chlorine and nitrate constituents is disclosed in the U.S. Pat. No. 4,642,192, issued Feb. 10, 1987 to Don E. Heskett. Heskett's method includes passing fluid containing chlorine and nitrate through a bed of granular metal particulate matter, having favorable redox potentials relative to the redox potentials of the undesirable constituents so as to establish conditions for spontaneous oxidation and reduction reactions between the undesirable constituents and the metal particles. Heskett's method relates to water treatment using only the metal particles. The present invention relates to a central controlled filtration system with pretreatment and post-treatment, and the metal septum (instead of metal particles) is one of eleven filter media adapted by the newly improved pressure filter. The Heskett's method cannot remove volatile, radioactive and living contaminants, but the present invention's method can.

Prior art concerning treatment of gas effluent from multistep liquid treatment systems has also been reviewed. Carnahan et al merely treat a gas effluent in a reactor tank with chlorine, in accordance with their U.S. Pat. No. 4,919,814. Irvine et al suggests such gas effluent being treated by carbon adsorption followed by membrane separation in accordance with their U.S. Pat. No. 5,126,050. (Col. 11, lines 36–41.) U.S. Pat. No. 4,894,162, awarded to Cournoyer et al in January 1990, suggests such gas effluent being treated by venturi dilution and collection in a tank where microorganism action purifies the gas. Anderson's U.S. Pat. No. 4,391,704 suggests venturi dilution, treatment with chlorine or ozone and adsorption. Meidl's U.S. Pat. No. 4,857,198 suggests initial adsorption followed by recycling of such gas effluent back to the treatment system. A publication by Waltrip et al (Journal WPCF, Vol. 57, No. 10, 1985) suggests primarily treatment of such gas effluent in a scrubber. The method and apparatus of this invention, however, relates to an air emission control means comprising a tank, at least one prescreen, a gas mover, a venturi dilution means, a demister, an adsorber, valves, and pipes. Said prescreen of this invention further comprises a coalescing filter screen, a fiberglass filter screen, a fibrous activated carbon filter screen, or combinations thereof. Said adsorber of this invention is packed with virgin granular activated carbon, virgin fibrous activated carbon, ion exchange resins, polymeric adsorbent, base treated activated carbon, aluminate treated activated carbon, base treated polymeric adsorbent, aluminate treated polymeric adsorbent, reticulated foam, fiberglass screen, fibrous activated carbon screen, coalescing filter screen, or combinations thereof for removal of radioactive and volatile contaminants from a gas effluent which will not be recycled.

SUMMARY OF THE INVENTION

In accordance with the present invention, an improved method and apparatus for removing suspended particulates, volatile organic compounds, heavy metals, iron, manganese, hardness, oil and grease, bacteria, radioactive gas, and odor from a contaminated liquid comprises the following steps, facilities and alterations:

(a) packing a pressure filter of said apparatus with a septum (i.e. filter element) and filter media which are selected from a group including diatomaceous earth, granular activated carbon, granular metal medium, chemical treated adsorbents, fibrous activated carbon, greensand, silica sand, neutralizing sand, activated alumina, ion exchange resins, polymeric adsorbents, coal, porous plastic medium, porous paper medium, porous carbon medium, coalescing filter medium, porous stainless steel medium, porous mild steel medium, porous ceramic medium, porous alloy medium, bacteriostatic filter medium, or combinations thereof, (b) loading a process tank of said apparatus with the regenerating chemicals, or flocculating chemicals, or filter aids or said granular filter media, (c) discharging the contaminated liquid to an influent pipe of said apparatus comprising an ultraviolet pretreatment means, a pressure pump, a central flow control means, said pressure filter, said process tank, a chemical feeder means, a piping system, an ultraviolet post-treatment means, compressed air aeration means, air emission control means, flow meters, pressure gauges and safety valves, (d) selecting either manual operation or automatic operation, (e) deciding a desired mode of operation (filtration, backwash, bypass, flushing, chemical preparation, recirculation, precoat, rinse, or desorption) by dialing either manually or automatically the selected operational mode marked on the center flow control which consists of a wide-open inlet port, an on-off port to said pressure filter, an on-off port from said pressure filter, an on-off outlet port to an effluent discharge pipe, an on-off outlet port to said process tank, and an on-off outlet port to said waste drain, (f) operating said apparatus at the filtration mode by pumping said liquid and (dialing the central flow control to "filtration") allowing the on-off ports to said process tank and said waste drain to be closed, and all other ports of said central flow control means to be open, when the ultraviolet pretreatment means and said chemical feeder means are on for liquid pretreatment and normal filtration operation, (g) or operating said apparatus at the backwash mode by pumping and (dialing the central flow control to "backwash") allowing the on-off ports to said process tank and said effluent discharge pipe to be closed, and all other ports of said central flow control means to be open for backwashing said pressure filter, (h) or operating said apparatus at the bypass mode by pumping said liquid and (dialing the central flow control to "bypass") allowing the on-off ports to and from said pressure filter, and to said process tank and said waste drain to be closed, and all remaining ports of said central flow control means to be open for said liquid to bypass both said pressure filter and said process tank and to be discharged by said pump through said central flow control means, (i) or operating said apparatus at the flushing mode by pumping said liquid and (dialing the control flow control to "flushing") allowing the on-off ports connecting to said pressure filter, process tank and effluent discharge pipe to be all closed, and the remaining ports to be open for flushing said central flow control means by said liquid, (j) or operating said apparatus at the chemical preparation mode by pumping said liquid and (dialing the central flow control to "preparation") allowing the on-off ports connecting to said pressure filter, effluent discharge pipe and waste drain to be closed, and the remaining ports of said control flow control means to be open, for mixing chemical(s) or filter aids, or granular filter media, with the influent contaminated liquid in said process tank, (k) or operating said apparatus at recirculation mode for liquid recirculation or media regeneration by pumping said liquid and (dialing the central flow control means to "recirculation/precoat" without pushing a "precoat" button) allowing the on-off ports connecting to said effluent discharge pipe and waste drain to be closed, and the remaining ports to be open, (l) or operating said apparatus at precoat mode by pumping said liquid, (pushing the precoat button and dialing the central flow control means to "recirculation/precoat") allowing the on-off ports connecting to said effluent discharge pipe and waste drain to be closed, when a filter media slurry is being recirculated through said pump, central flow control means, pressure filter, central flow control means and process tank for precoating said filter media onto a filter septum of said pressure filter, (m) or operating said apparatus at special desorption mode by not pumping said liquid (pushing the desorption button, and dialing the central flow control means to "rinse/desorption") allowing the on-off ports connecting to said effluent discharge pipe and said process tank to be closed, the on-off ports connecting to said pump and said pressure filter entrance to be idled, and all remaining ports of said central flow control means to be open, for initially discharging the residual water inside said pressure filter, subsequently desorbing (regenerating) the reactive filter media inside said pressure filter using compressed air, and finally treating the emitted gas from said pressure filter using an air emission control means, (n) or operating said apparatus at rinse (purging) mode by pumping said liquid and (dialing the central flow control to "rinse/desorption", without pushing the "desorption" button) allowing the on-off ports connecting to said effluent discharge pipe and said process tank to be closed, and all remaining ports of said central flow control means to be open, when the chemical feeder means is closed, (o) post-treating the filter effluent along said effluent discharge pipe, with ultraviolet, ozone, hydrogen peroxide, or hypochlorite, during the filtration mode, and (p) discharging the post-treated product liquid from the end of said effluent discharge pipe.

While the primary object of this invention is to provide a new and improved filtration method, another object of this invention is for the provision of a new and improved liquid and gas filtration apparatus comprising the following:

(a) an influent liquid pipe leading a contaminated liquid into an ultraviolet pretreatment means of said apparatus, (b) said ultraviolet pretreatment means connected to said both influent liquid pipe and a process tank for receiving and treating the contaminated liquid with ultraviolet and thereby producing an ultraviolet pretreated liquid, (c) a chemical feeder means connected to said ultraviolet pretreatment means and said process tank for feeding chemical, further treating of the ultraviolet pretreated liquid, and producing a chemical pretreated liquid, or for feeding regenerating chemical, filter aids, or granular filter media in slurry form, (d) a pump connected to said chemical feeder means and a central flow control means for providing energy to move the ultraviolet and/or chemical pretreated liquid throughout entire apparatus, (e) said central flow control means connected to said pump, said process tank, a pressure filter, an effluent discharge pipe and a waste drain, and having a handle for manual or automatic dialing, a wide-open influent port and multiple on-off ports, for directing a body of liquid from the pump to proper flow direction, (f) said pressure filter connected to said central flow control means and comprising a liquid inlet, a liquid outlet, said filter media for purifying the liquid from said central flow control means, a filter septum for supporting said filter media, a compressed gas inlet for desorbing and regenerating said filter media, a condensate outlet, and a gas outlet, (g) said process tank connected to said central flow control means and said chemical feeder means for preparing and storing chemicals and filter aids, and for pretreating the contaminated liquid, (h) said effluent discharge pipe connected to said central flow control means for discharging the liquid from said central flow control means, (i) said waste drain connected to said central flow control means for discharging wastes, (j) said ultraviolet post-treatment means connected to said effluent discharge pipe for post-treating the liquid from said central flow control means, and thereby producing an apparatus effluent (product liquid), (k) a final effluent discharge pipe connected to said ultraviolet post-treatment means for discharging the apparatus effluent, (l) an internal process piping system connecting the influent liquid pipe, said ultraviolet pretreatment means, said chemical feeder means, said pump, said central flow control means, said pressure filter, said process tank, said ultraviolet post-treatment means, said effluent discharge pipe, said final effluent discharge pipe, and said waste drain and equipped with flow meters, pressure gauges and safety valves, and (m) an air emission control means connected to said waste drain and comprising an inlet pipe, a tank, a gas inlet, a gas outlet, liquid valves, gas valves, a demister pad, a gas mower, prescreens, gas sampling ports, liquid outlets, an adsorber, a pressure vacuum gauge, and a venturi gas dilution means, for collecting residual liquid and a gas effluent from said pressure filter and said central flow control means, and for purifying and/or diluting said gas effluent.

Specifically the air emission control means of this invention is a gas filtration apparatus comprising:

(a) an inlet pipe and a gas inlet for introducing a contaminated gas into said apparatus, (b) a tank connected to said inlet pipe and having a bottom, side walls, and a top thereof as an outside wall of said apparatus, (c) liquid valves for discharging accumulated liquid inside said apparatus, (d) a prescreen means for preliminary filtering said contaminated gas, thereby producing a prescreened gas; said prescreen means further comprising a coalescing filter screen, a fiberglass filter screen, a fibrous filter screen, or combinations thereof, (e) a gas mover connected to said tank for moving said prescreened gas, (f) a gas valve and a venturi gas dilution means connected to said gas mover for diluting said prescreened gas, thereby producing a diluted gas to be discharged into ambient air, (g) a gas sampling point connected to said gas mover for collecting said prescreened gas for analysis, (h) a demister connected to said gas mover for removing moisture from said prescreened gas, (i) an adsorber connected to said demister for removing volatile and radioactive contaminants from said prescreened gas and thereby producing an adsorber effluent; said adsorber further comprising an adsorption tank, a gas inlet, a gas outlet, adsorbent (virgin granular activated carbon, virgin fibrous activated carbon, ion exchange resins, polymeric adsorbent, base treated activated carbon, aluminate treated activated carbon, base treated polymeric adsorbent, aluminate treated polymeric adsorbent, reticulated foam, fiberglass screen, fibrous activated carbon screen, coalescing filter screen, or combinations thereof), valves, and pipes, and (j) said gas outlet connected to said adsorber for discharging said adsorber effluent to the ambient air environment.

It is yet another object of the subject invention for the provision of a new and improved filtration system with ozonation, chlorination, and ultraviolet irradiation treating means either upstream or downstream of a pressure filter for water purification. The present invention is used for removal of not only suspended particles, but also living microorganisms, soluble iron, manganese, heavy metals, hardness, volatile organic compounds, radioactive gas, odor, and colloidal solids from contaminated river water, lake water, groundwater, domestic sewage, industrial process liquid, storm run-off, and swimming pool water.

BRIEF DESCRIPTION OF THE DRAWINGS

The present invention will become more fully understood from the description given herein below and the accompanying drawings which are given by way of illustration, and thus are not limitative of said present invention, and wherein:

FIGS. 2 to 10 inclusive present the flow diagrams of filtration mode, backwash mode, by-pass mode, flushing mode, preparation mode, recirculation mode, precoat mode, rinse mode, and desorption mode, respectively, of an improved filtration, according to the present invention.

DESCRIPTION OF THE PREFERRED EMBODIMENTS

Figure 1C:
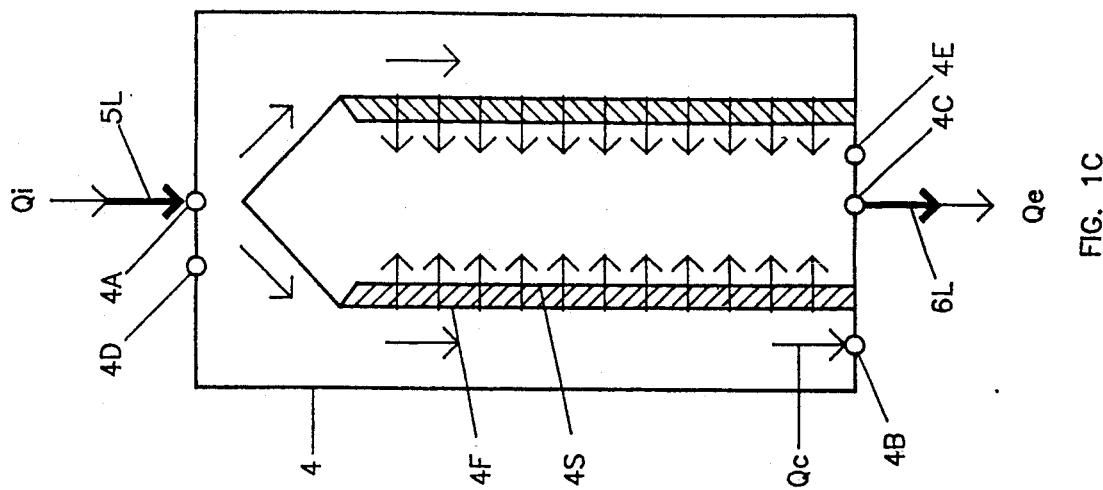
FIGS. 1A to 1I illustrate various configurations of a pressure filter, in accordance with the present invention.

The present invention, as shown in FIGS. 1 to 11, relates to a central controlled reactive/regenerative filtration process and apparatus by which the water is pretreated or post-treated with ultraviolet, ozone, hydrogen peroxide, flocculating chemical, permanganate, and hypochlorite, and by which living, non-living, suspended, volatile, radioactive, and dissolved contaminants are efficiently removed from water under one of pressurized innovative hydraulic patterns shown in FIGS. 1A to 1H.

Ozonation, ultraviolet, peroxide oxidation, permanganate oxidation, and chlorination are the processes involving the use of ozone, ultraviolet, hydrogen peroxide, potassium permanganate and sodium (or calcium) hypochlorite, respectively.

The major components of the present invention include an ultraviolet pretreatment means 5, a pressure pump 2, a central flow control means 3, a pressure filter 4, an ultraviolet post-treatment means 6, a process tank 11, a chemical feed system (chemical feeder means) 7, an operating valve 8, a check valve 40, an air emission control means 14, and a pipe line system comprising pipes 1L, 2L, 3L, 4L, 5L, 6L, 7L, 8L, 9L, 10L and 11L, all shown in FIGS. 2 to 10.

Figure 10:
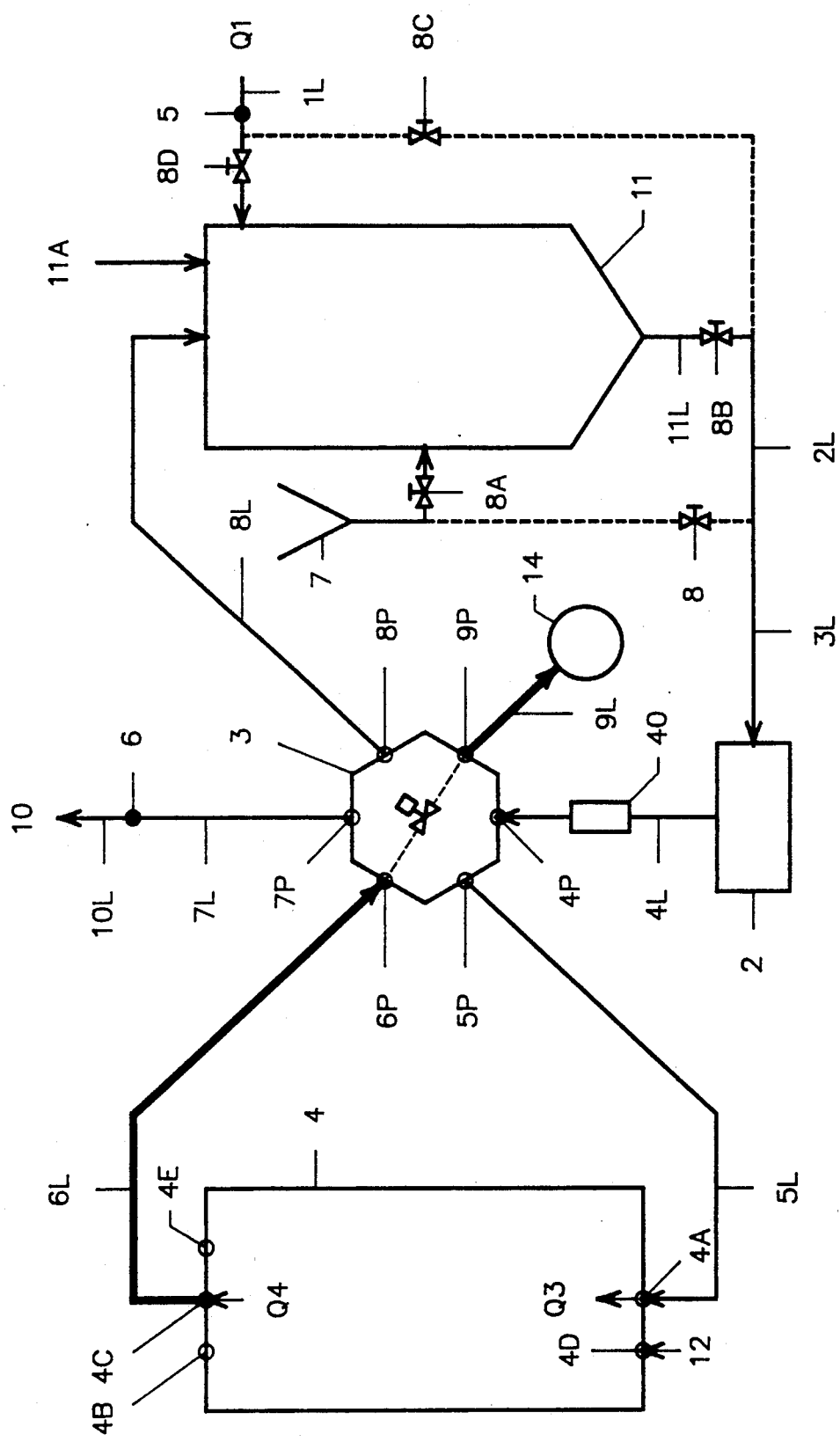
Figure 11:
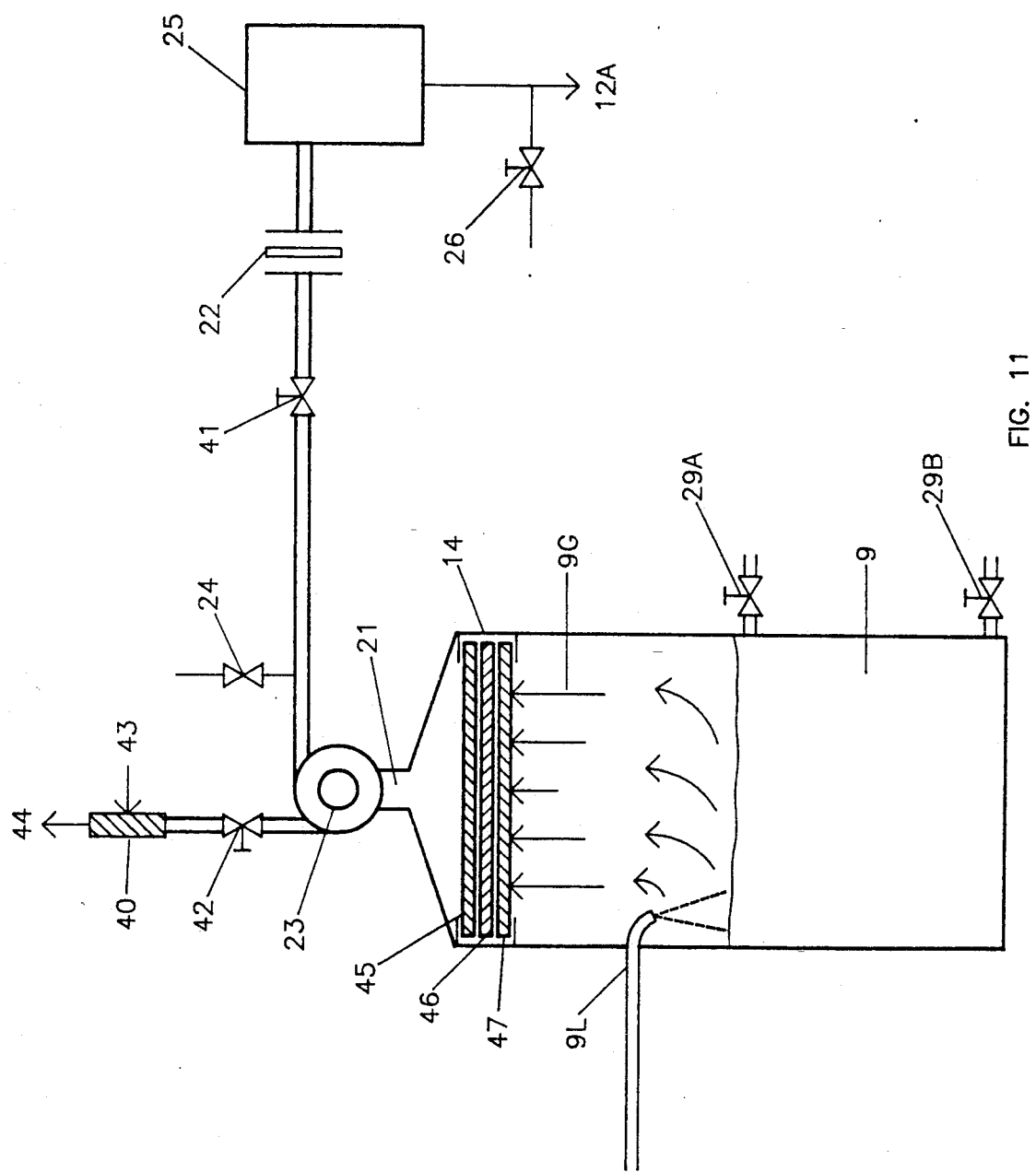
FIG. 11 illustrates an air emission control means, according to the present invention.

FIG. 11 illustrates said air emission control means 14 (also see FIG. 10) in accordance with the present invention.

Both said ultraviolet pretreatment means 1 and said ultraviolet post-treatment means 5 kill pathogenic legionella as well as other pathogenic microorganisms by ultraviolet irradiation which has emerged as the best disinfection technology especially suitable for use with point-of-entry (POE) devices.

The multi-purpose chemical feed system (chemical feeder means) 7 with its control valve 8 provide additional pretreatment to the contaminated liquid Q1 using ozone, hypochlorite (a free chlorine), hydrogen peroxide, potassium permanganate, or combinations thereof. With 0.2 mg/l of residual ozone, and 0.3 minute of contact time, over 99% of Legionella pneumophila was killed. With 0.5 mg/l (in terms of free chlorine) of calcium hypochlorite and 1 minute of contact time, again over 99% of Legionella pneumophila reduction was achieved. In the case of the present invention, calcium hypochlorite in dry tablet form is used for small POE disinfection operations and ozone and hydrogen peroxide are used for institutional operations.

Ozone ($O_3$), potassium permanganate ($KMnO_4$) or hydrogen peroxide ($H_2O_2$) is fed through the chemical feed system 7 for removal of iron and manganese by conversion of soluble iron and manganese in the contaminated liquid Q1 into their insoluble forms, so they can be effectively filtered out by the pressure filter 4 in accordance with the following chemical reactions:

soluble divalent ferrous ions+$O_3$(or $KMnO_4$ or
$H_2O_2$)=insoluble ferric oxide or soluble ferric ions soluble ferric ions+hydroxide ions=insoluble ferric hydroxide soluble divalent manganese ions+$O_3$(or $KMnO_4$ or $H_2O_2$)=insoluble manganese oxide For a prolonged filtration operation, the pressure filter 4 is completely sealed and normally operated under one of three crossflow hydraulic conditions: an upward-crossflow (FIGS. 1A and 1B), a downward-crossflow (FIG. 1C), or a horizontal crossflow (not shown). The same pressure filter 4 is technically called a horizontal crossflow filter under horizontal crossflow condition, a downward crossflow filter under downward crossflow condition, or an upward crossflow filter under upward crossflow condition. During normal upward crossflow filtration operation shown in FIGS. 1A, 1B, and 2, the filter influent Qi enters said pressure filter 4 at inlet 4A, filter effluent Qe exits at filter outlet 4C, and a small volume of concentrate Qc exits at another filter outlet 4B. In case the filter outlet 4B in FIG. 2 is shut off, the pressure filter 4 is then operated under conventional upflow filtration condition.

Figure 1B:
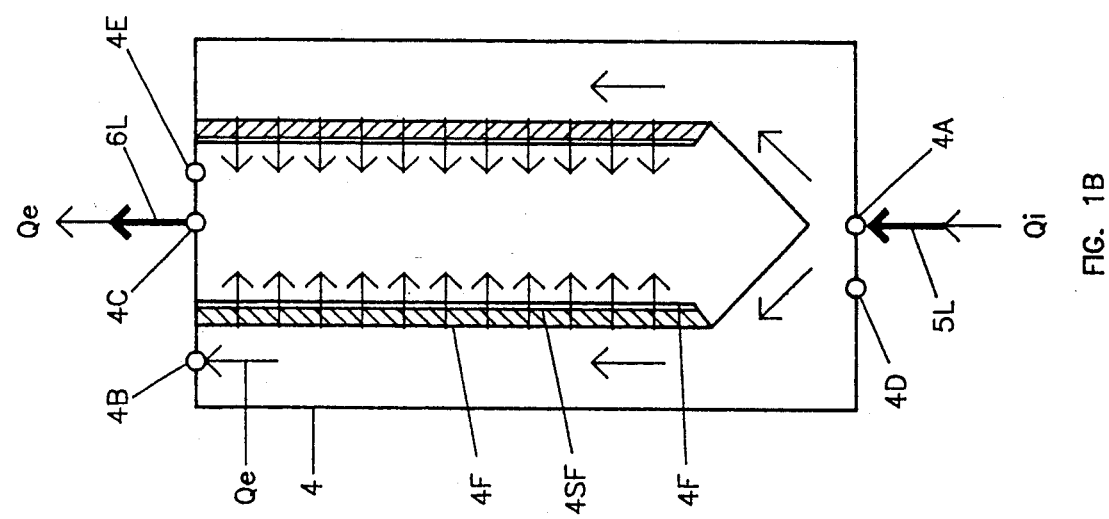
Figure 1A:
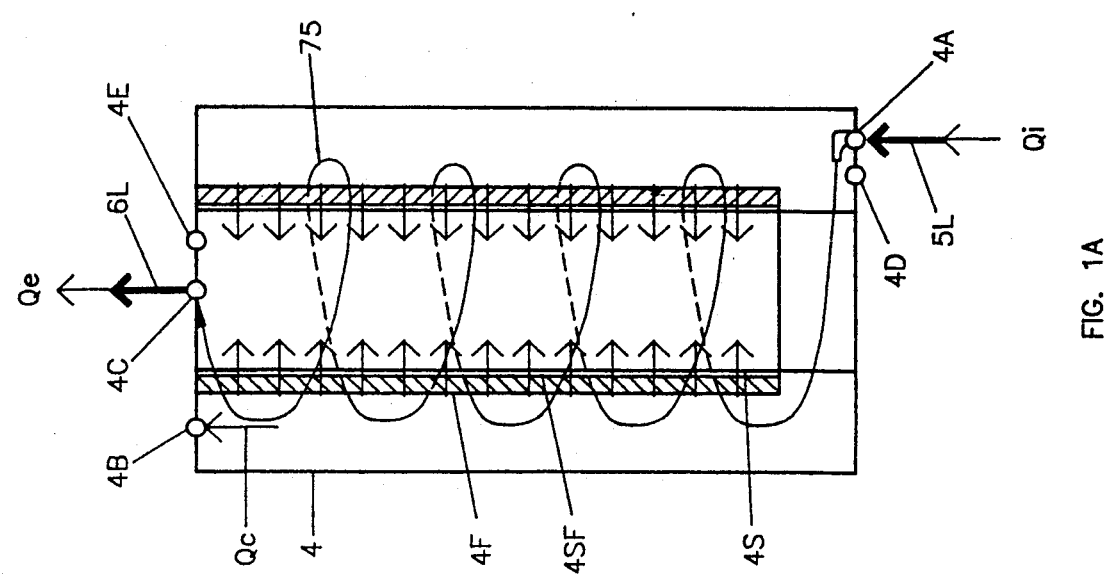
Figure 1F:
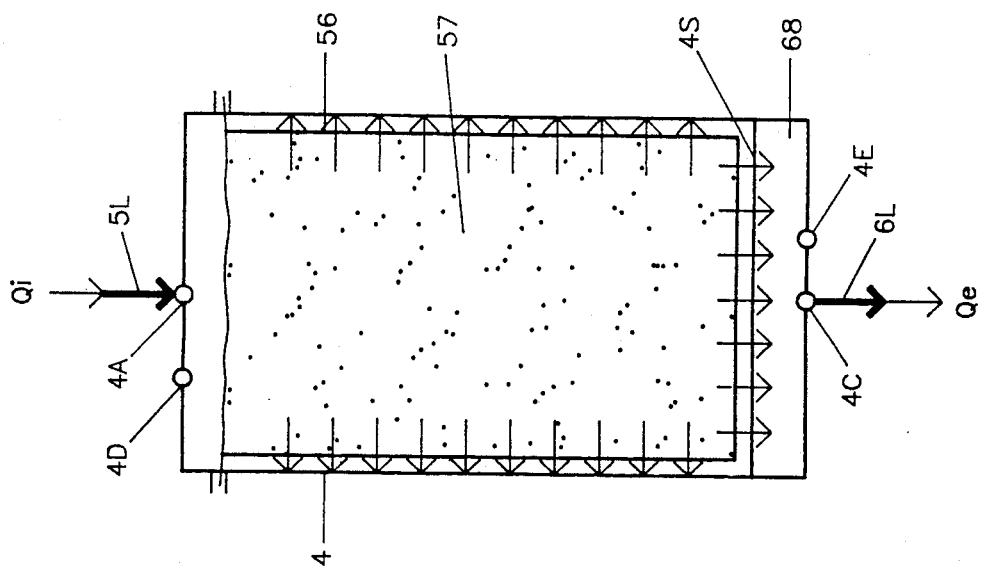
Figure 1E:
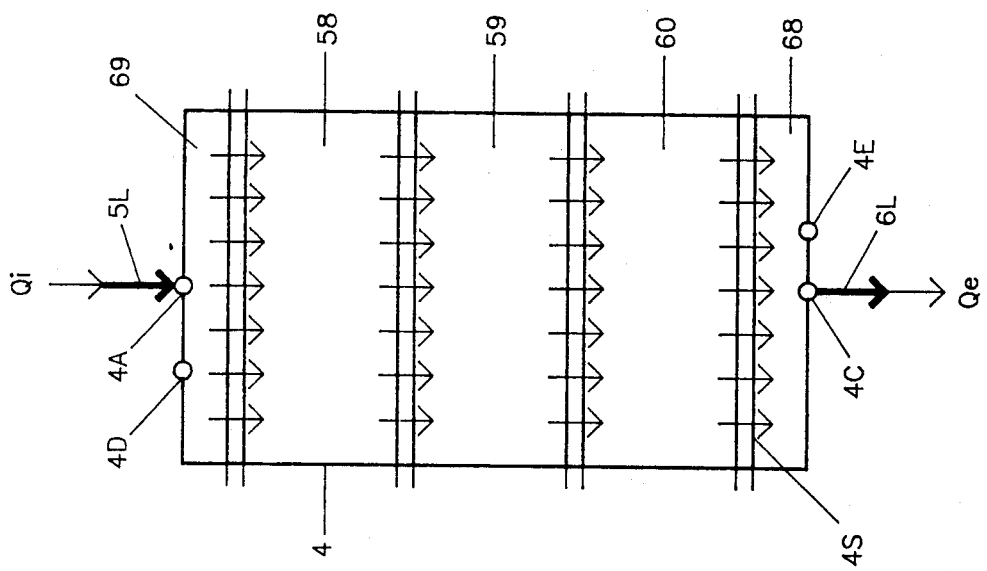
Figure 1D:
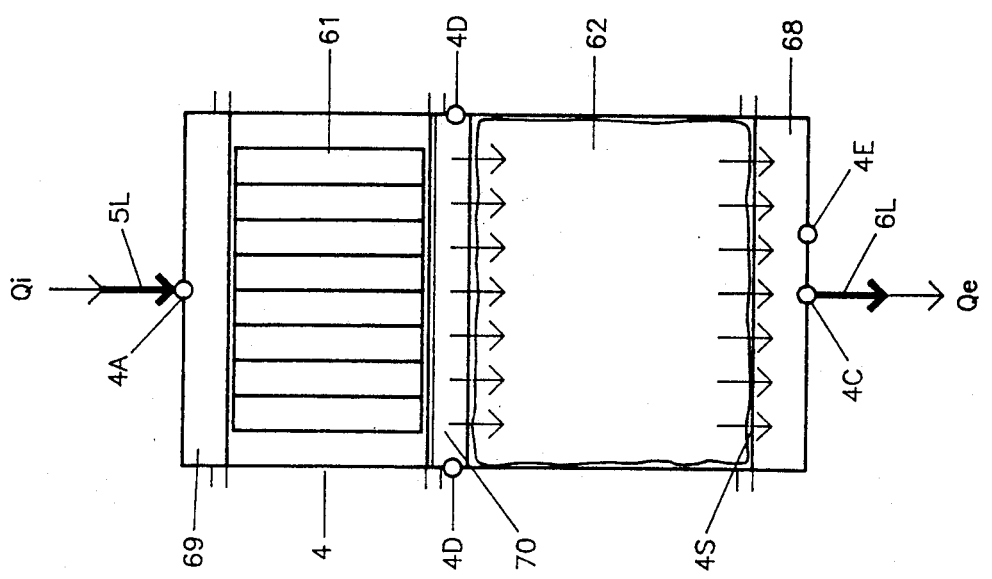
Figure 1I:
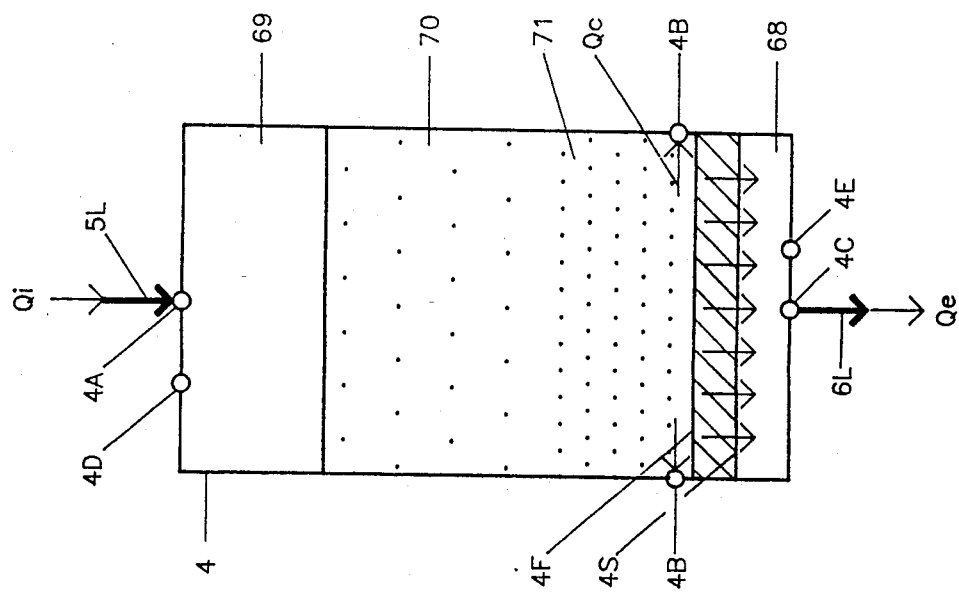

The pressure filter 4 of the present invention, shown in FIGS. 1A, 1B, 1C, 1G and 1I, normally comprises both the granular filter media 4F and at least one filter septum (filter element) 4S. In a preferred embodiment, porous stainless steel medium, porous ceramic medium, porous plastic medium or porous alloy medium is placed inside said pressure filter 4 as the filter septum (filter element) 4S for supporting the granular filter media 4F which are selected from a group including granular activated carbon, chemical treated adsorbent, polymeric adsorbent, granular activated alumina, granular metal medium, greensand, neutralizing sand, silica sand, coal, diatomaceous earth, manganese dioxide, ion exchange resins (cation exchange resins, anion exchange resins), bacteriostatic filter medium (silver impregnated granular activated carbon, iodinated resin), or combinations thereof. Several selected examples are given below for illustration of the treatment efficiency of said pressure filter 4 when reactive filter media are used. The porous plastic medium is selected from a group including polyethylene, nylon, PVC, or combinations thereof. Inside said pressure filter 4, the filter element 4S accepts both reactive and non-reactive granular filter media either as a precoat media (FIGS. 1A, 1B, 1C, 1D, and 1G) or fixed filter bed media (FIG. 1I). Inside said pressure filter 4, the reactive granular filter media 4F are precoated on the surface of said filter element (filter septum) 4S with more than one layer of media and with coarser media to be coated on the outside layer. Besides, the filter element (filter septum) 4S is wrapped up with an optional porous expandable elastic sleeve 4SF before being precoated for enhancement of precoat filtration operation (FIGS. 1A and 1B).

The reactive granular filter media 4F adapted by the present invention are packed in the pressure filter 4 either as a fixed filtration bed (FIGS. 1G and 1I) or as a precoat filtration bed (FIGS. 1A, 1B, and 1C). The fixed bed filtration is operated either in the presence or in the absence of reactive granular filter media.

The first example of reactive granular filter media to be used in said pressure filter 4 is the silver impregnated granular activated carbon (GAC), which is designed to slowly release biocide (i.e. low concentration of silver ions) into the pathogen-carrying water. The silver impregnated GAC maintains a constant residual concentration of silver ions regardless of the presence of microorganisms; therefore it is called constant-release disinfectant/adsorbent. The silver impregnated GAC not only destroys pathogenic microorganisms, but also removes toxic dissolved organics (such as trihalomethanes, phenols, formaldehydes, etc.), toxic dissolved inorganics (such as lead, excessive chlorine, hydrogen sulfide, etc.) and insoluble suspended solids. Under normal tap water supply conditions that trihalomethanes, coliform bacteria, and lead concentrations in the tap water (i.e. influent liquid to said apparatus) will not be as high as 200 ppb, 135 coliform colonies/100 ml, and 150 ppb, respectively. The pressure filter 4 containing the silver impregnated GAC reduces trihalomethanes, coliform bacteria and lead to 6 ppb, 0 colonies/100 ml and 17 ppb, respectively. The silver impregnated GAC also removes bad taste, odor, hydrogen sulfide from water. The virgin GAC can also be adapted for removal of toxic organics, heavy metals, bad taste, odor and hydrogen sulfide, but not for disinfection.

Any granular activated carbons (virgin GAC and the silver impregnated GAC) as well as fibrous activated carbons (FAC) adopted by the present invention also remove toxic radioactive radon gas from a contaminated liquid, such as groundwater.

The following are physical-chemical reactions of the present invention for removal of volatile organic compounds (VOCs) and radioactive radon gas from a contaminated liquid, and for regeneration of the spent GAC (either a virgin GAC or a silver impregnated GAC or a base-treated GAC) for reuse, all using the present invention's apparatus:

GAC+contaminated liquid containing VOCs and radon=VOCs and radon impregnated spent GAC+purified liquid VOCs and radon impregnated spent GAC+compressed gas=regenerated GAC+gas effluent containing VOCs and radon regenerated GAC+contaminated liquid containing VOCs and radon=VOCs and radon impregnated GAC+purified liquid The second reactive granular filter media to be used in the pressure filter 4 are the iodinated, strong-base resins that release iodine upon demand to microorganisms in water. Bacteria including Staphylococcus aureus, E. Coli, Pseudomonas aeruginosa, Salmonella pullorum each at the concentration of $2.3 \times 10^4$ colonies/ml, and viruses including Polyoma, Newcastle Disease, Poliovirus, each the concentration of $2.0 \times 10^4$ plaque forming units per milliliter (pfu/ml) are totally disinfected after the pathogen-carrying water is contacted with the iodinated strong base resins.

The third reactive granular filter media to be used in the pressure filter 4 is similar to the medium described in the U.S. Pat. No. 4,642,192, issued Feb. 10, 1987 to Don E. Heskett, and called brass KDF. Heskett's filter medium works on the redox principle of dissimilar metals and lasts from ten to twenty times longer than GAC for removal of excessive amount of chlorine from tap water, or for removal of algae from reservoir water or swimming pool water. The brass making up the KDF medium contains approximately: 59.2% copper, 35.2% zinc, 2.5% lead and 0.2% iron by weight. The brass KDF is commonly used in solid granular form as the filter medium in conventional filters, but it is used in porous cartridge form as one of the septums in the pressure filter 4 of the present invention.

The fourth reactive granular filter medium suitable for use in the pressure filter 4 is the manganese greensand from the mineral glauconite, also known as Ferrosand, which operates on the chemical principle of oxidation and reduction and the catalytic effect of manganese oxides, for removal of excessive soluble iron and manganese from water, without the need for long reaction times and/or high pH levels. The pressure filter 4 is installed either vertically or horizontally. The greensand is not only reactive, but also regenerative. About 2 oz. of potassium permanganate is required for regeneration of 1 cubic foot of greensand for its reuse. Like other granular filter media, greensand also removes insoluble suspended contaminants. In addition, it removes hydrogen sulfide up to 5 mg/l. Assuming Z represents the black manganese greensand granules, the following two chemical reactions show how the soluble manganese $Mn^{+2}$ and soluble iron $Fe^{+2}$ are removed by the pressure filter 4:

$$Z^*MnO_2 + Mn^{+2} + Fe^{+2} = Z^*Mn_2O_2O_3 + MnO_2 + Fe^{+3}$$

$$Fe^{+3} + 3OH \text{ (hydroxide ions)} = Fe(OH)_3$$

Both $MnO_2$ and $Fe(OH)_3$ with underlines are insoluble precipitates which are removed by filtration and backwash. The following is the chemical reaction showing how the spent manganese greensand is regenerated with potassium permanganate $KMnO_4$ solution:

$$Z^*Mn_2O_3 + KMnO_4 = Z^*MnO_2 + K^+$$

The regenerated greensand $Z^*MnO_2$ can then be reused.

Manganese dioxide is a reactive granular filter medium similar to greensand, and is the fifth filter medium for use in the pressure filter 4 as the filter media 4F. Adsorption of many toxic soluble heavy metals (nickel, cadmium, zinc, lead, copper, silver, and selenium) onto manganese has been scientifically established.

Activated alumina having a formula of $(Al_2O_3)n^*H_2SO_4$ contains mainly aluminum oxides and is the sixth reactive granular filter medium adopted by the pressure filter 4 of the present invention. Activated alumina when packed in said pressure filter 4 as the filter media 4F is very effective for controlling fluoride (F) in drinking water. In general, it is necessary to control and maintain the concentration of fluoride below 1 mg/l. The following is the chemical reaction for fluoride removal:

$$(Al_2O_3)n^*H_2SO_4 + 2F^- = (Al_2O_3)n^*2HF + SO_4^{-2}$$

This filter medium, activated alumina, is also of a regenerative type. The spent activated alumina is regenerated with sulfuric acid $H_2SO_4$ or aluminum sulfate $Al_2(SO_4)_3$ for reuse:

$$(Al_2O_3)n^*2HF + SO_4^{-2} = (Al_2O_3)n^*H_2SO_4 + 2F^-$$

Between 1 to 2 mg $F^-$ are removed per each gram of activated alumina, depending the particle size of the filter medium in the range of 0.6 to 5 mm at pH=8. Soluble cations that can be removed by activated alumina include uranium, zirconium, cerium, iron, titanium, mercury, lead, copper, silver, zinc, cobalt, nickel, thallium, and manganese. Soluble anions that can be removed by activated alumina include $AsO_4^{-3}$, $PO_4^{-3}$, $C_2O_4^{-2}$, $F^-$, $SO_3^{-2}$, $Fe(CN)_6^{-4}$, $CrO_4^{-2}$, $S_2O_3^{-2}$, $Fe(CN)_6^{-3}$, $Cr_2O_7^{-2}$, $NO_2^-$, $CNS^-$, $I^-$, $Br^-$, $Cl^-$, $NO_3^-$, $MnO_4^-$, $ClO_4^-$, $CH_3COO^-$ and $S^{-2}$. Removal of dissolved organics by activated alumina is improved by preoxidation with ozone or hydrogen peroxide, of this invention.

The neutralizing sands including Calcite and magnesium oxide (known as Corosex) are the seventh and the eighth type of reactive granular filter media to be packed in said pressure filter 4 for the purpose of filtration as well as neutralization. Calcite is a crushed and screened white marble sand which is inexpensively used to neutralize acidic or low pH waters to produce a neutral non-corrosive product water. In theory, acidic water on contact with Calcite slowly dissolves the calcium carbonate filter media thus raises the pH. Calcite contains 95% of $CaCO_3$ and 3% of $MgCO_3$. The service flow rate is about 3 to 6 gpm/ft$^2$.

Another neutralizing sand, magnesium oxide, contains about 97% MgO, and is grayish white. Magnesium oxide, or Corosex, is specially processed hard, beadlike filter media adapted for use in said pressure filter 4 to neutralize extremely high acidity by chemical reaction, in turn, increasing the pH value of water. Downflow filtration operation is satisfactory on waters with a hardness of less than 5 gpg, or where it is combined with Calcite at a ratio of 50%—50%. Upflow filtration operation is generally recommended with hardness exceeding 5 gpg to prevent cementing of the filtration bed inside said pressure filter 4. The service rate of this reactive granular filter medium can be as high as 5 gpm/ft$^2$.

High capacity cation exchange resins are the ninth type of reactive granular filter media which are used as the filter media 4F inside said pressure filter 4 for removal of cationic soluble metals, calcium hardness, magnesium hardness, and cationic organic surfactants. Assuming E represents the fixed portion of the cation exchange resin granules, $M1^+$, $M2^{+2}$ & $M3^{+3}$ represent monovalent, divalent and trivalent, respectively, of soluble heavy metals ($Zn^{+2}$, $Cu^{+2}$, $Ag^+$, $Ni^{+2}$, $Se^{+2}$, $Cr^{+3}$, $Pb^{+2}$, $Fe^{+3}$, $Fe^{+2}$, $Mn^{+2}$, etc.), $Ca^{+2}$ represents calcium hardness, $Mg^{+2}$ represents magnesium hardness, $H^+$ represents hydrogen ion, and $T^+$ represents soluble cationic toxic organics, the removal reactions are as follows:

$$E^*H \text{ (cation exchange resin)} + M1^+ = E^*M1 \text{ (spent cation exchange resin)} + H^+$$

$$2E^*H \text{ (cation exchange resin)} + M2^{+2} = 2E^*0.5M2 \text{ (spent cation exchange resin)} + 2H^+$$

$$3E^*H \text{ (cation exchange resin)} + M3^{+3} = 3E^*0.333M3 \text{ (spent cation exchange resin)} + 3H^+$$

$$4E^*H \text{ (cation exchange resin)} + Ca^{+2} + Mg^{+2} = 2E^*0.5Ca + 2E^*0.5Mg + 4H^+$$

$$E^*H \text{ (cation exchange resin)} + T^+ = E^*T \text{ (spent cation exchange resin)} + H^+$$

E*H in the above equations represents the cation exchange resin in hydrogen form; so E*H releases H$^+$ in low concentration after reaction. In case the cation exchange resin in sodium form E*Na is used in replacement of E*H, Na$^+$ (instead of H$^+$) will be released to water in the above equations; the spent cation exchange resins will be the same, however.

All spent cation exchange resins designated above can be effectively regenerated by using highly concentrated acid or brine (sodium chloride; NaCl) solutions as follows:

$$E^*M1 + H^+ \text{ (regenerant)} = E^*H \text{ (regenerated cation exchange resin)} + M1^+$$

$$2E^*0.5M2 + 2H^+ \text{ (regenerant)} = 2E^*H \text{ (regenerated cation exchange resin)} + M2^{+2}$$

$$3E^*0.333M3 + 3H^+ \text{ (regenerant)} = 3E^*H \text{ (regenerated cation exchange resin)} + M3^{+3}$$

$$2E^*0.5Ca + 2E^*0.5Mg + 4H^+ \text{ (regenerant)} = 4E^*H \text{ (regenerated cation exchange resin)} + Ca^{+2} + Mg^{+2}$$

$$E^*T + H^+ \text{ (regenerant)} = E^*H \text{ (regenerated cation exchange resin)} + T^+$$

where H+ ions are supplied by highly concentrated acid. All E*H on the right-hand side of equations are regenerated cation exchange resins in hydrogen form, and ready for reuse in said pressure filter 4; and M1+, M2+2, M3+3, Ca+2, Mg+2 and T+ are highly concentrated rejects ready to be discharged for waste disposal.

In case highly concentrated brine NaCl is used for regeneration of spent cation exchange resins, NaCl will provide Na+ ions (instead of H+ ions) for regeneration. The regenerated cation exchange resins will be in sodium form E*Na (instead of E*H) and M1+, M2+2, M3+3, Ca+2, Mg+2 and T+ are also produced in the reject solutions. Accordingly, the cation exchange resins are reactive as well as regenerative granular filter media.

High capacity anion exchange resins belong to the tenth type of reactive granular filter media which are used inside said pressure filter 4 aiming at removal of anionic soluble impurities and toxics, including but not being limited to: AsO4−3, PO4−3, C2O4−2, F, SO3−2, Fe(CN)6−4, CrO4−2, S2O3−2, SO4−2, Fe(CN)6−3, Cr2O7−2, NO2−1, CNS−, I−, Br−, Cl−, NO3−, MnO4−, ClO4−, CH3COO−, and S−2. The above are the most common impurities in tap water. Examples are presented below showing how they are removed by anion exchange resin in hydroxide form E*OH, and how the spent anion exchange resins are regenerated by strong alkaline solution such as sodium hydroxide NaOH. A1−, A2−2 and A3−3 now represent soluble monovalent, divalent, and trivalent, respectively, of the above anionic impurities/toxics. E represents the fixed portion of the anion exchange resin granules, and E*OH is the anion exchange resin in hydroxide form.

$$E^*OH \text{ (anion exchange resin)} + A1^- = E^*A1 \text{ (spent anion exchange resin)} + OH^-$$

$$2E^*OH \text{ (anion exchange resin)} + A2^{-2} = 2E^*0.5A2 \text{ (spent anion exchange resin)} + 2OH^-$$

$$3E^*OH \text{ (anion exchange resin)} + A3^{-3} = 3E^*0.333A3 \text{ (spent anion exchange resin)} + 3OH^-$$

As shown in the above three equations, hydroxide ions OH− are released in low concentration to the treated water after anionic impurities/toxics are removed by the anion exchange resins.

When the anion exchange resins are exhausted and spent, they are due for regeneration with highly concentrated sodium hydroxide NaOH solution (or other concentrated base solution, such as potassium hydroxide KOH) so the above three chemical equations can be forced to reverse:

$$E^*A1 + OH^- \text{ (regenerant)} = E^*OH \text{ (regenerated anion exchange resin)} + A1^-$$

$$2E^*0.5A2 + 2OH^- \text{ (regenerant)} = 2E^*OH \text{ (regenerated anion exchange resin)} + A2^{-2}$$

$$3E^*0.333A3 + 3OH^- \text{ (regenerant)} = 3E^*OH \text{ (regenerated anion exchange resin)} + A3^{-3}$$

where A1−, A2−2 and A3−3 are the rejects in high concentration but low volume, ready to be discharged for waste disposal.

Diatomaceous earth (DE) is the non-reactive granular filter media commonly used in all conventional precoat filters for removal of non-living, insoluble, suspended contaminants from water. The process and apparatus of this invention involves the use of reactive granular filter media for removal of living, non-living, dissolved and suspended contaminants from water; besides, most of reactive granular filter media are regenerative. DE is adapted as the filter aid or filler in the present invention for filtration operation and cost-saving.

The present invention also relates to the adoption of polymeric adsorbents as the filter media 4F in the pressure filter 4 for removal of volatile organic compounds (VOCs) and radioactive radon gas from a contaminated liquid. Polymeric adsorbents are the man-made products with many micropores. The following are physical-chemical reactions for the present invention to remove both volatile and radioactive contaminants from a contaminated liquid using polymeric adsorbents (PA) and to regenerate the spent polymeric adsorbents for reuse:

$$PA + \text{contaminated liquid containing VOCs and radon} = \text{VOCs and radon impregnated spent } PA + \text{purified liquid}$$

$$\text{VOCs and radon impregnated spent } PA + \text{compressed gas} = \text{regenerated } PA + \text{gas effluent containing VOCs and radon}$$

$$\text{regenerated } PA + \text{contaminated liquid containing VOCs and radon} = \text{VOCs and radon impregnated } PA + \text{purified liquid}$$

The adsorber 25 of this invention shown in FIG. 11 contains adsorbent and is used for purification of said gas effluent containing VOCs and radon gas which is released during the process of GAC regeneration or the process of PA regeneration in a desorption mode (FIG. 10), in accordance with the following physical-chemical reactions:

$$\text{adsorbent} + \text{gas effluent containing VOCs and radon} = \text{VOCs and radon impregnated spent adsorbent} + \text{purified gas effluent}$$

Said purified gas effluent 12A shown in FIG. 11 can then be directly discharged into ambient air environment. The VOCs and radon impregnated spent adsorbent is solidified by cement and/or polymeric solidifying agent for final disposal in a sanitary landfill. Alternatively, said gas effluent containing VOCs and radon can be released without hazard into the ambient air environment if diluted by a venturi dilution means 40 (FIG. 11) to a concentration deemed safe by regulating agencies, so said adsorbent in said adsorber 25 is not needed. Still alternatively said adsorber 25 containing said adsorbent is adopted for gas purification, and the spent adsorbent is collected for commercial regeneration or commercial disposal by a licensed environment firm.

Said adsorbent in said adsorber 25 is chosen from a group comprising fibrous activated carbon (FAC), granular activated carbon (GAC), polymeric adsorbent (PA), chemical treated adsorbent, base treated GAC, base treated FAC, coalescing filter medium, porous paper filter medium, porous carbon filter medium, porous fiber glass filter medium, or combinations thereof. Said base is sodium hydroxide, potassium hydroxide, calcium hydroxide, sodium aluminate, or combinations thereof.

The reactive granular filter media 4F adapted by the present invention are packed in the pressure filter 4 either as a fixed filtration bed or as a precoat filtration bed, as shown in FIGS. 1A–1I either in the presence or in the absence of diatomaceous earth (DE).

The central controlled filtration system with pretreatment and post-treatment, as in the case of the present invention, has nine operational modes: filtration (FIG. 2), backwash (FIG. 3), bypass (FIG. 4), flushing (FIG. 5), chemical preparation (FIG. 6), recirculation (FIG. 7), precoat (FIG. 8), rinse (FIG. 9) and desorption (FIG. 10), which each is chosen by manually or automatically dialing the operational mode marked on the central flow control means 3.

The central flow control 3 consists of a wide-open inlet port 4P, an on-off port 5P to said pressure filter 4, an on-off port 6P from said pressure filter 4, an on-off port 8P to said process tank 11, and an on-off outlet port 7P to said waste drain 7L & 10L, and is clearly marked for the modes of operation including at least filtration, backwash, bypass, flushing, preparation, recirculation/precoat, and rinse/desorption.

More than one chemical feeder means 7 and valves 8 can be provided to the apparatus of the present invention.

The entire apparatus of the present invention is of modular design, each comprising a piping system 1L–10L, a chemical feed system 7, a pump 2, a central flow control means 3, a pretreatment means 5 and a post-treatment means 6. One or more than one modules (each having different reactive granular filter media) is installed together for a specific water treatment application. Since there is only one central flow control means for each module, the automation is accomplished mechanically and electrically, although manual operation is also very simple and satisfactory.

Figure 6:
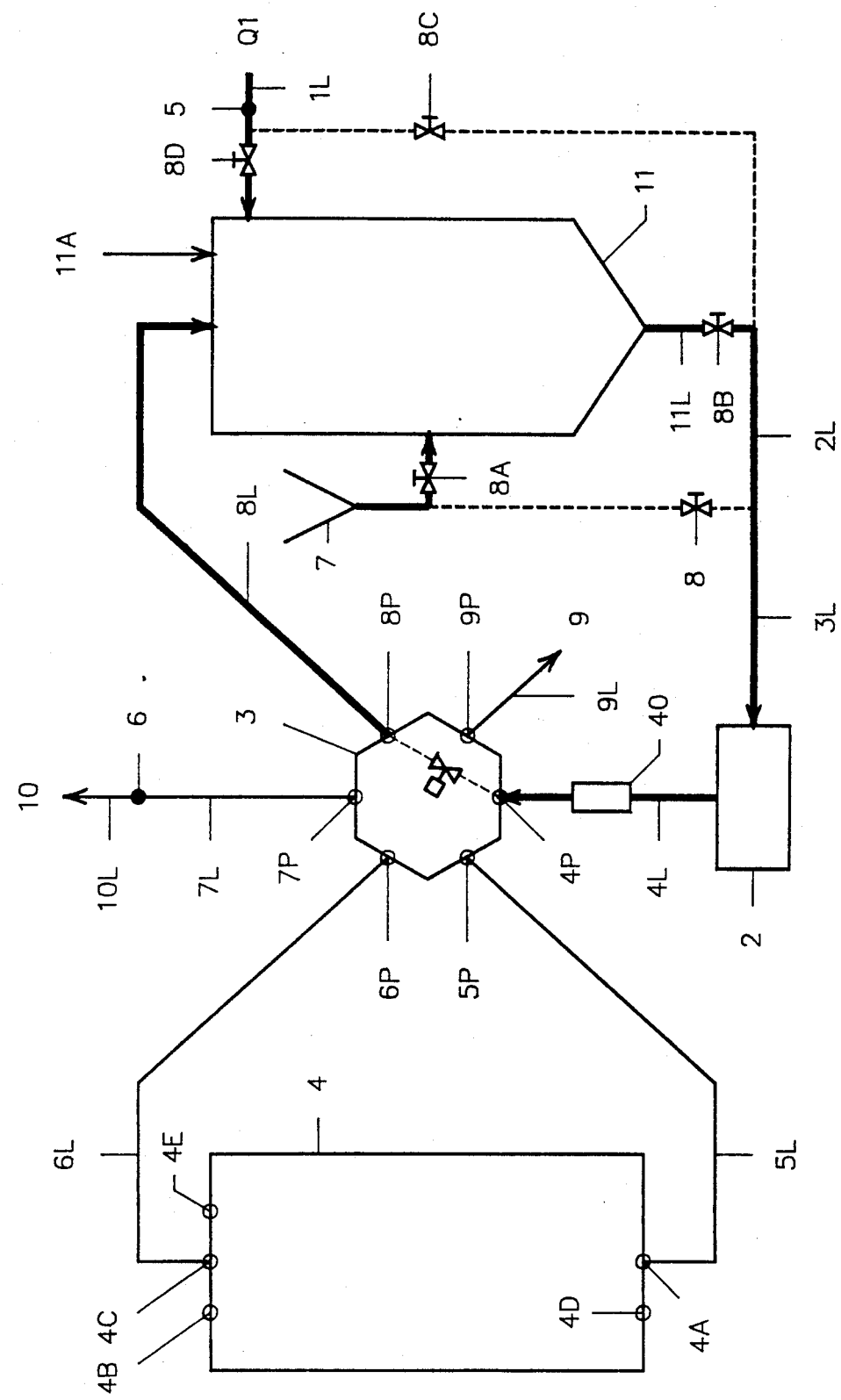
Figure 8:
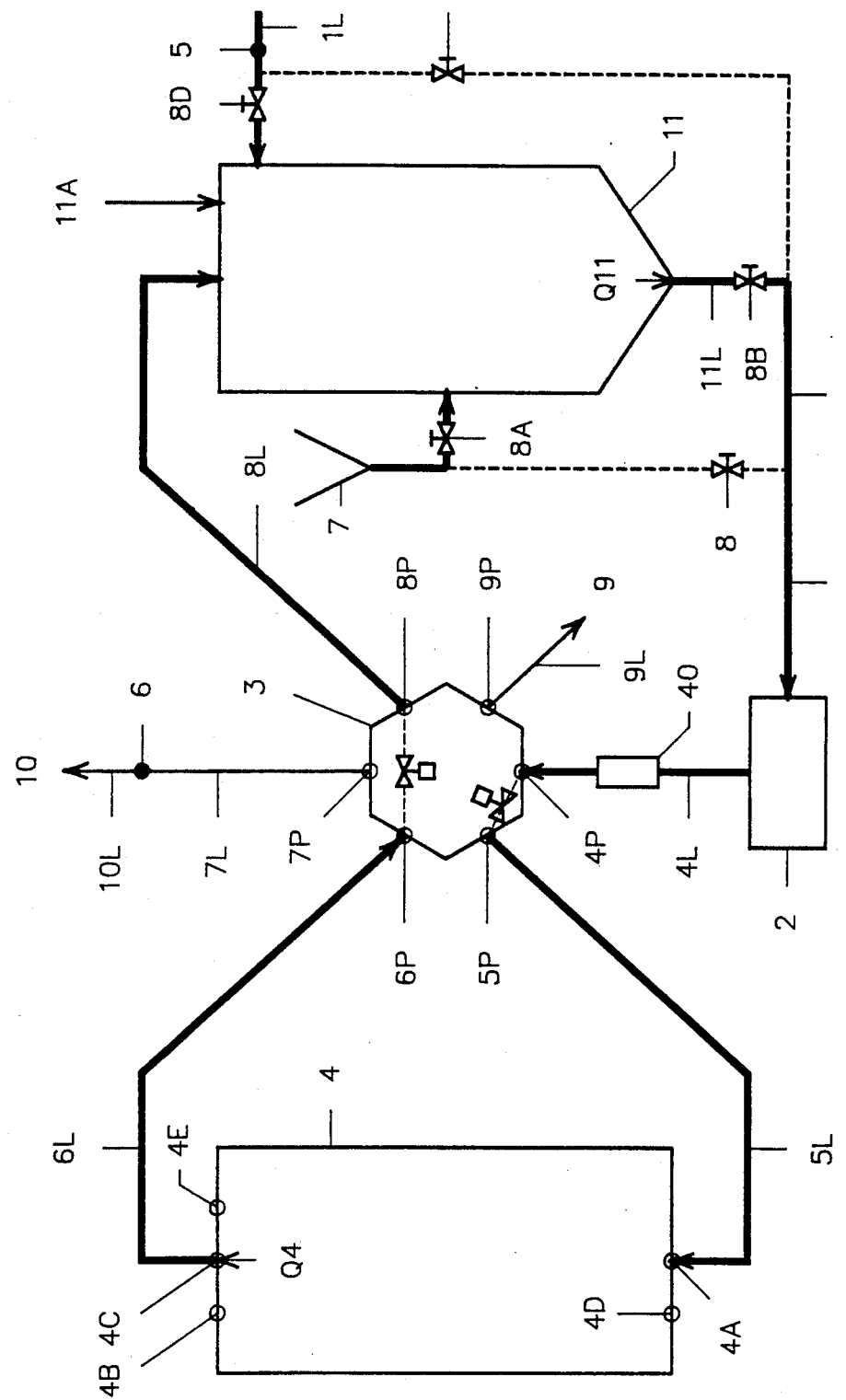

The chemical feed system 7 and the process tank 11 feeds and mixes, respectively, reactive granular filter media during precoat operation, shown in FIG. 8; while the same chemical feed system 7 and the process tank 11, feeds and mixes, respectively, the chemicals for regeneration of filter media inside said pressure filter 4 during chemical preparation operation shown in FIG. 6. The chemical for regeneration of cation exchange resins is sodium chloride (or an acid) which is fed and processed by said chemical feed system 7 and said process tank 11, respectively; while the chemical for regeneration of anion exchange resins is sodium chloride (or a base) which is also fed and processed by said chemical feed system 7 and said process tank 11, respectively.

The simplicity of the improved liquid filtration is fully illustrated in FIG. 1A to 11 by its minimum number of required valves (one central flow control means and a few chemical feed calibration valves as the minimum) although addition of more valves will not hinder the filtration operation of the present invention.

Detailed description of operational features of the preferred embodiment is illustrated in FIGS. 2 to 10 inclusive which are a set of schematic diagrams of the present invention when applied to liquid filtration under different modes of operations.

FIGS. 1A through 1I inclusive illustrate various designs of said pressure filter 4 in accordance with this invention.

FIG. 1A presents the flow pattern and inside structure of said pressure filter 4 which is assembled and operated as an upward crossflow filter with an elastic monofilament sleeve 4SF covering the outside of said filter septum 4S. The filter media 4F is precoated on said sleeve 4SF, by said precoat mode shown in FIG. 8. During said filtration mode of operation shown in FIGS. 1A and 2, the rotating flow pattern 75 inside said pressure filter 4 allows a longer filtration run in comparison with a similar filtration operation (FIG. 1B) without said rotating flow pattern 75.

FIG. 1B represents another flow pattern and inside structure of said pressure filter 4 which is also assembled and operated as an upward crossflow filter with an elastic monofilament sleeve 4SF covering the outside of said filter septum 4S to support said filter media 4F, but without a rotating flow pattern inside said pressure filter 4.

FIG. 1C illustrates a situation when said pressure filter 4 is operated as a downward crossflow filter without an elastic monofilament sleeve and rotating flow pattern. The filter media 4F is precoated onto said filter septum 4S directly for the purpose of liquid filtration.

FIG. 1D illustrates an alternative of said pressure filter 4 comprising multiple cells of filter cartridges 61 and a filter bag 62 containing reactive filter media, such as granular activated carbon, polymeric adsorbent, reticulated foam, neutralizing sand, manganese oxides, ion exchange resin, or combinations thereof. The pressure filter 4 shown in FIG. 1D is designed for fast and easy replacement of filter cartridges 61 and said filter bag 62. The entire pressure filter 4 can be disassembled and reassembled in minutes. Chambers 68, 69, and 70 are empty spaces for uniform fluid distribution. Although the pressure filter 4 shown in FIG. 1D is a downflow filter, it can also be operated as an upflow filter if the direction of liquid flow is reversed. Said filter cartridges 61 can be of prefabricated disposal type requiring no precoating and backwashing, or of reusable type comprising a filter septum, an optional monofilament sleeve, and filter media, and requiring precoating and backwashing.

FIG. 1E is a downflow modular pressure filter 4 comprising multiple filter modules 58, 59 and 60, packed with reactive and non-reactive filter media. Again, the entire pressure filter 4 can be disassembled and reassembled in minutes because each module can be taken apart individually and easily for replacement or regeneration. Chambers 68 and 69 are empty spaces for uniform liquid distribution. Said pressure filter 4 can be operated as an upflow filter if the liquid flow is reversed, and requires no precoating or backwashing.

FIG. 1F features easy drop-in filter bag 56 to be mounted inside said pressure filter 4, and supported by a filter septum 4S. Said drop-in filter bag 56 can be used alone for filtration, or be filled with reactive and non-reactive filter media 57 described previously. As a typical example, when said drop-in filter bag 56 is packed with hydrophobic reticulated foam as said filter media 57, the pressure filter 4 becomes effective for removal of oil and grease from water. Although FIG. 1F shows only one drop-in filter bag 56 in said pressure filter 4, there can be more tan one drop-in filter bags installed in said pressure filter 4.

Figure 1H:
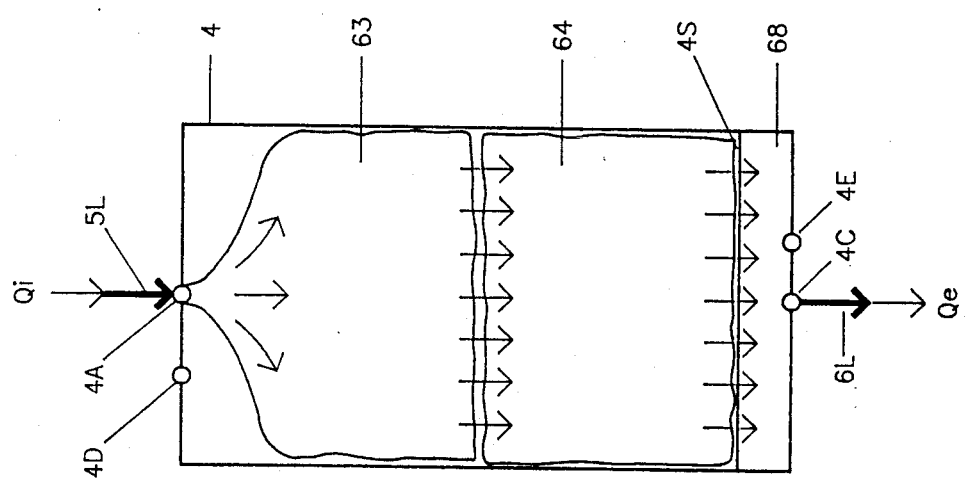
Figure 1G:
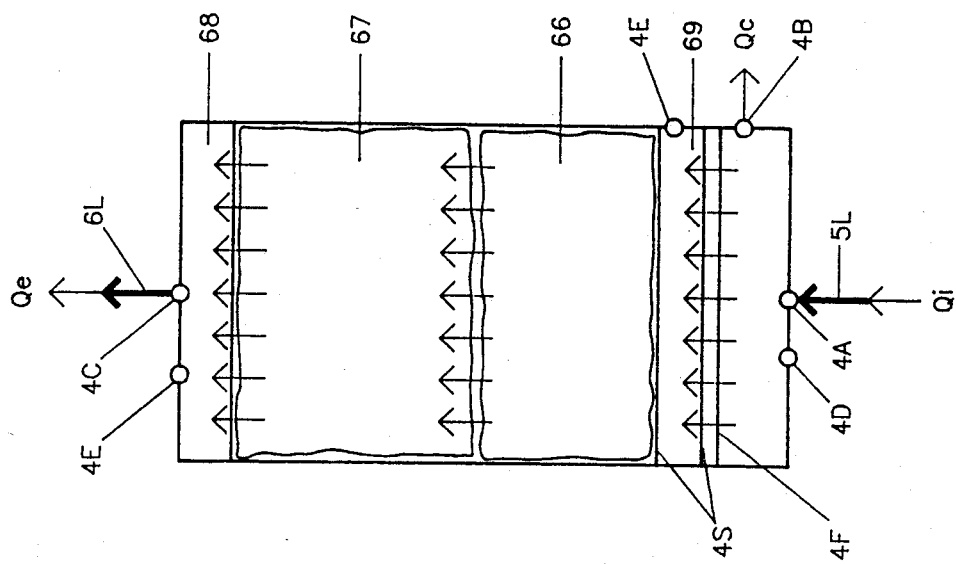

FIG. 1G is an alternative upflow pressure filter 4 comprising filter septum 4S, filter media 4F, fluid distribution chamber 68 and 69, and filter bags 66 and 67. Said filter bags 66 and 67 further contain reactive and non-reactive filter media described previously. Said filter media 4F can be precoated and backwashed. Said pressure filter 4 shown in FIG. 1G can be a downflow filter if it is positioned upside down.

FIG. 1H is another alternative pressure filter 4 comprising a filter bag 63 connected to a filter entrance 4A and said pipe 5L, a second filter bag 64, a filter septum 4S, a fluid distribution chamber 68, and a filter exit 4C. Other components of said pressure filter 4 have been defined previously. A quick disconnect coupling at said filter entrance 4A is featured for removing and attaching said filter bag 63.

All bag filters, including drop-in filter bags can have a choice of different micron bags ranging from 1 to 1000 microns.

FIG. 1I is an improved downflown pressure filter 4 comprising a filter entrance 4A, fluid distribution chambers 68 and 69, filter media 4F, a filter septum 4S, a concentrate outlet 4B, and a filter exit 4C. Said filter media 4F can be of permanent type requiring periodical backwashing or precoat type requiring both periodical backwashing and precoating.

Accordingly, said pressure filter 4 is completely sealed and has means for packaging said pressure filter 4 with disposable filter cartridges, replaceable filter bags, modular filters, drop-in filter bags, permanent filter septum, elastic monofilament sleeve, filter media, means for receiving and existing liquid, means for desorption, means for liquid distribution, means for concentrate discharge, or combinations thereof. Said pressure filter 4 also has means for operating said pressure filter means as a crossflow filter (with or without rotating flow; with or without elastic monofilament sleeve; downflow, upflow or horizontal flow; with or without precoat), or a conventional filter (upflow or downflow).

Said filter septum 4S (FIGS. 1A–1I) is made of porous stainless steel, mild steel, plated steel, alloy, ceramic, glass, fiberglass, or plastic (polyethylene, nylon, CPVC, PVC, polypropylene) medium, or combinations thereof.

As a brief summary, the reactive and non-reactive filter media 4F (FIGS. 1A–1I) of this invention is selected from a group including granular metal medium, manganese dioxide, diatomaceous earth, regular granular activated carbons, bacteriostatic filter medium (silver impregnated granular activated carbon or iodinated resin), granular activated alumina, ion exchange resins (cation exchange resins, or anion exchange resins), green sand, neutralizing sand, silica sand, coal, polymeric adsorbent, reticulated foam, fibrous activated carbon, coalescing filter medium, or combinations thereof. The chemical to be adopted by this invention is a regenerating chemical (potassium permanganate, sodium chloride, sodium iodide), an acid, a base, a disinfectant (ozone, hypochlorite, chlorine), a filter aid, a precoat chemical (reactive granular filter media, diatomaceous earth), a flocculating chemical (aluminum sulfate, aluminum chloride, ferric sulfate, ferric chloride, poly aluminum chloride, poly ferric chloride, sodium aluminate, calcium hydroxide, calcium oxide, polyelectrolyte), or combinations thereof.

The process tank 11 of this invention is operated as a sequencing batch sedimentation reactor, a sequencing batch flotation reactor, a continuous flocculation-sedimentation clarifier, or a continuous flocculation-flotation clarifier.

Referring to FIG. 2 for said filtration mode of operation, the influent liquid Q1 with ultraviolet pretreatment means 5 and chemical pretreatment is pumped by a pump 2, through an influent pipe 1L, 2L, 3L and 4L to a central flow control means 3, from which the pretreated influent liquid Qi goes to a pressure filter 4 through pipe 5L for treatment during the filtration mode. When operating said apparatus at the filtration mode by dialing the central flow control means 3 to "filtration" (not shown), the on-off ports 8P and 9P to said process tank 7 and said waste drain 9L, respectively, are to be closed, and all other ports 4P, 5P, 6P and 7P of said central flow control means 3 are open. The pressure filter 4 which is completely sealed during filtration operation, purifies said pretreated influent liquid Qi and returns the filter effluent Qe to said central flow control means 3 through pipe 6L before its being discharged to pipe 7L for the ultraviolet post-treatment means 6. The post-treated liquid is the product liquid 10 from the effluent pipe 10L. The on-off valve 4B of said pressure filter 4 is on for discharge of concentrate Qc in small volumetric rate for the crossflow operation, and is off for the non-crossflow operation.

Figure 3:
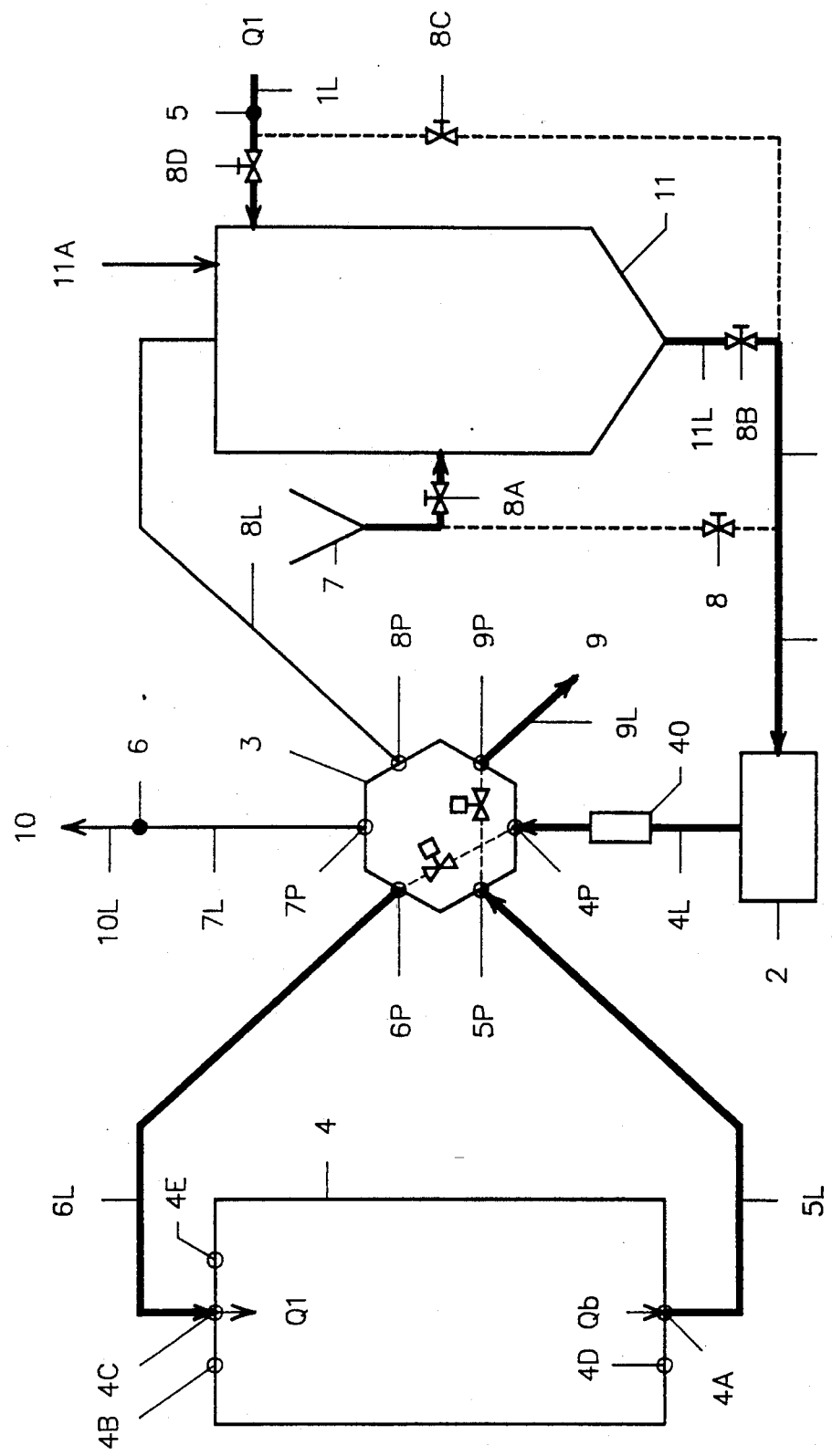

Referring FIG. 3 for said backwash mode of operation, the pressure filter 4 which is completely sealed during filter backwash, receives reversed influent liquid Q1 flow from said pump 2 and said central flow control means 3, through pipes 1L, 2L, 3L, 4L and 6L, self-cleans the granular filter media inside of said pressure filter 4 and returns the backwash wastewater Qb to said central flow control means 3 before its being discharged to a waste drain 9L as the waste 9. When operating said apparatus at the backwash mode by pumping and dialing the central flow controls to "backwash" (not shown), the on-off ports 8P and 7P to said process tank 11 and said discharge pipe 7L, respectively, are closed, and all other ports 4P, 5P, 6P and 9P of said central flow control means 3 are open. The on-off valves 4B and 8 are closed.

Figure 4:
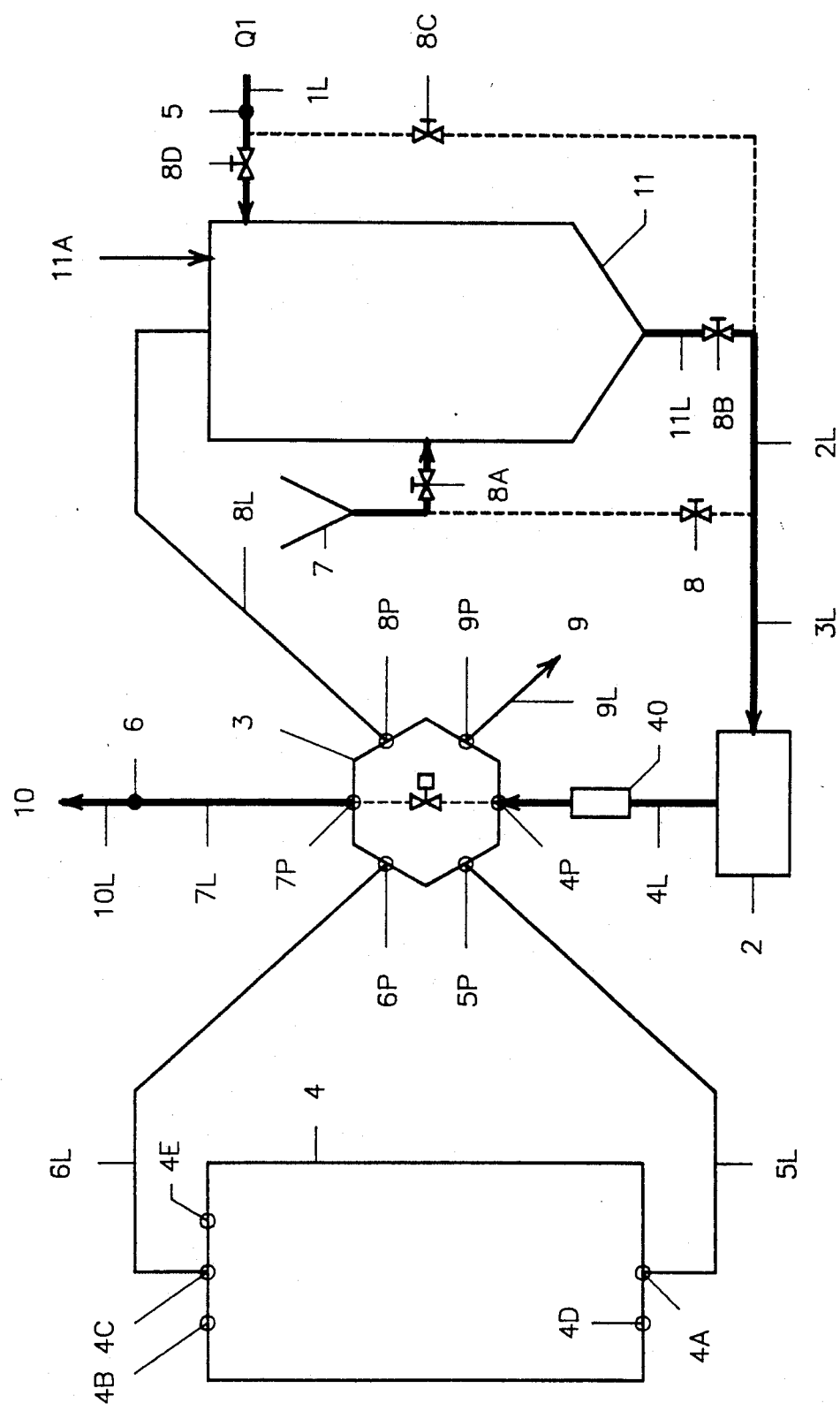

Referring to FIG. 4 for said bypass mode of operation, the central flow control means 3 receives said influent liquid Q1 from said pump 2 and discharges said influent liquid Q1 as the product liquid 10 directly during the bypass mode of operation. When operating said apparatus at the bypass mode by pumping and dialing the central flow control to "bypass" (not shown), the on-off ports 5P and 6P to and from said pressure filter 4, and the on-off ports 8P and 9P to said process tank 11 and said waste drain 9L are closed, and all remaining ports 4P and 7P of said central flow control means 3 are open. It is a direct bypass if the influent liquid Q1 is not pretreated by ultraviolet pretreatment unit 5, and chemical feed system 7 and not post treated by ultraviolet post-treatment means 6. It is a bypass of filtration if the influent liquid Q1 is pretreated and/or post-treated, except not filtered.

Figure 5:
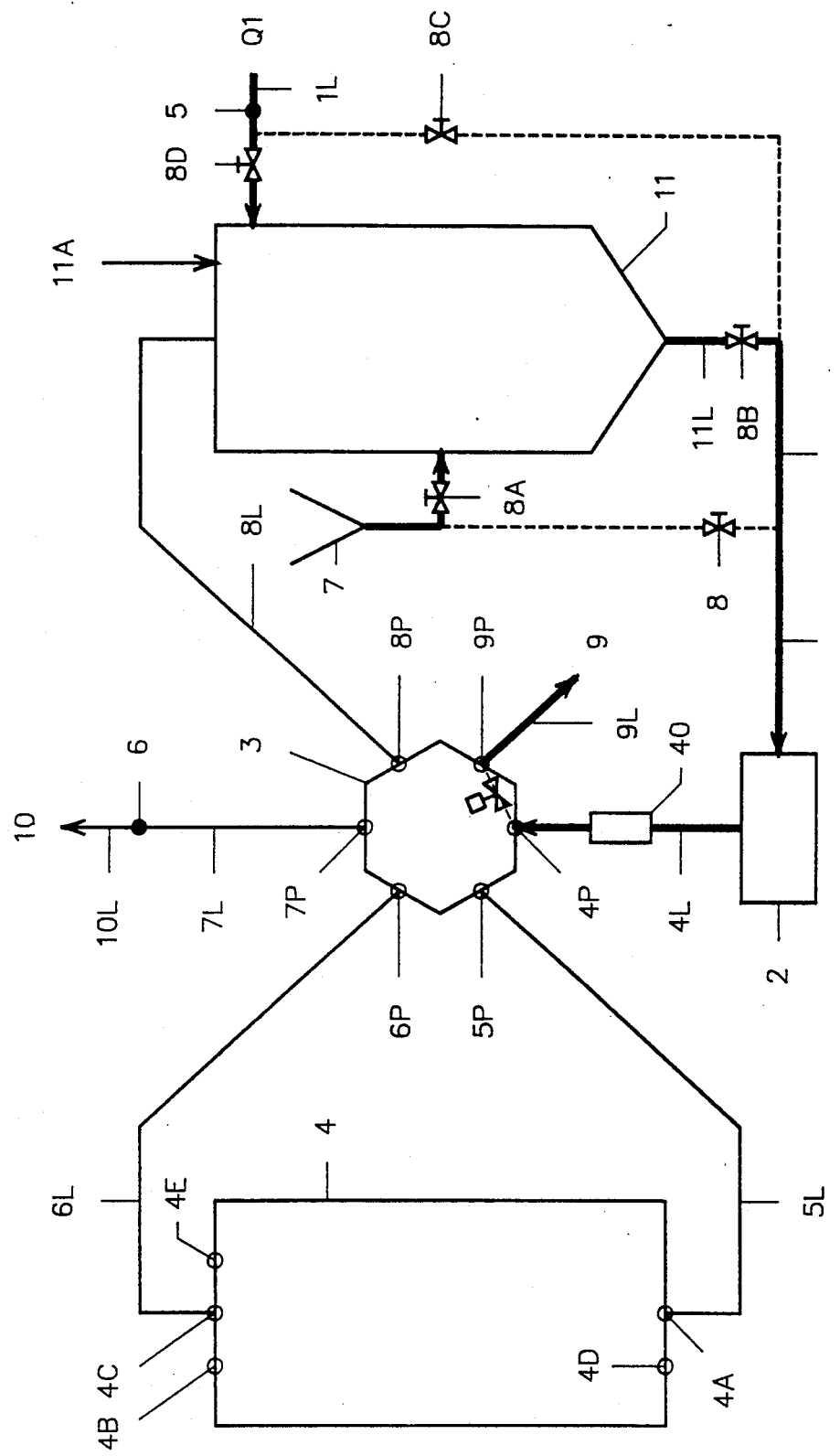

Referring to FIG. 5, the central flow control means 3 receives said influent liquid Q1 from said pump 2 and wastes said influent liquid Q1 immediately to said waste drain 9L during the flushing mode of operation. The influent Q1 is not pretreated. When operating said apparatus at the flushing mode by pumping and dialing the control flow control means 3 to "flushing" (not shown), the on-off ports 5P, 6P, 7P, and 8P connecting to said pressure filter 4, process tank 11 and discharge pipe 7L are all closed, and the remaining ports 4P and 9P are open.

Referring to FIG. 6, the central flow control means 3 receives said influent liquid Q1 containing chemical from chemical feed system 7 and from said pump 2, discharges said influent liquid Q1 containing chemical to said process tank 11 for chemical preparation during the preparation mode of operation. The chemical is fed to the influent liquid Q1 through the chemical feed system 7 and valve 8. The source of influent liquid Q1 is discontinued when there is enough liquid, and the valve 8 is closed when there is enough chemical for chemical preparation. When operating said apparatus at the chemical preparation mode by pumping and dialing the central flow control means 3 to "preparation" (not shown), the on-off ports 5P, 6P, 7P and 9P connecting to said pressure filter 4, liquid discharge pipe 7L and waste drain 9L are closed and the remaining ports 4P and 8P of said control flow control means 3 are open.

Figure 7:
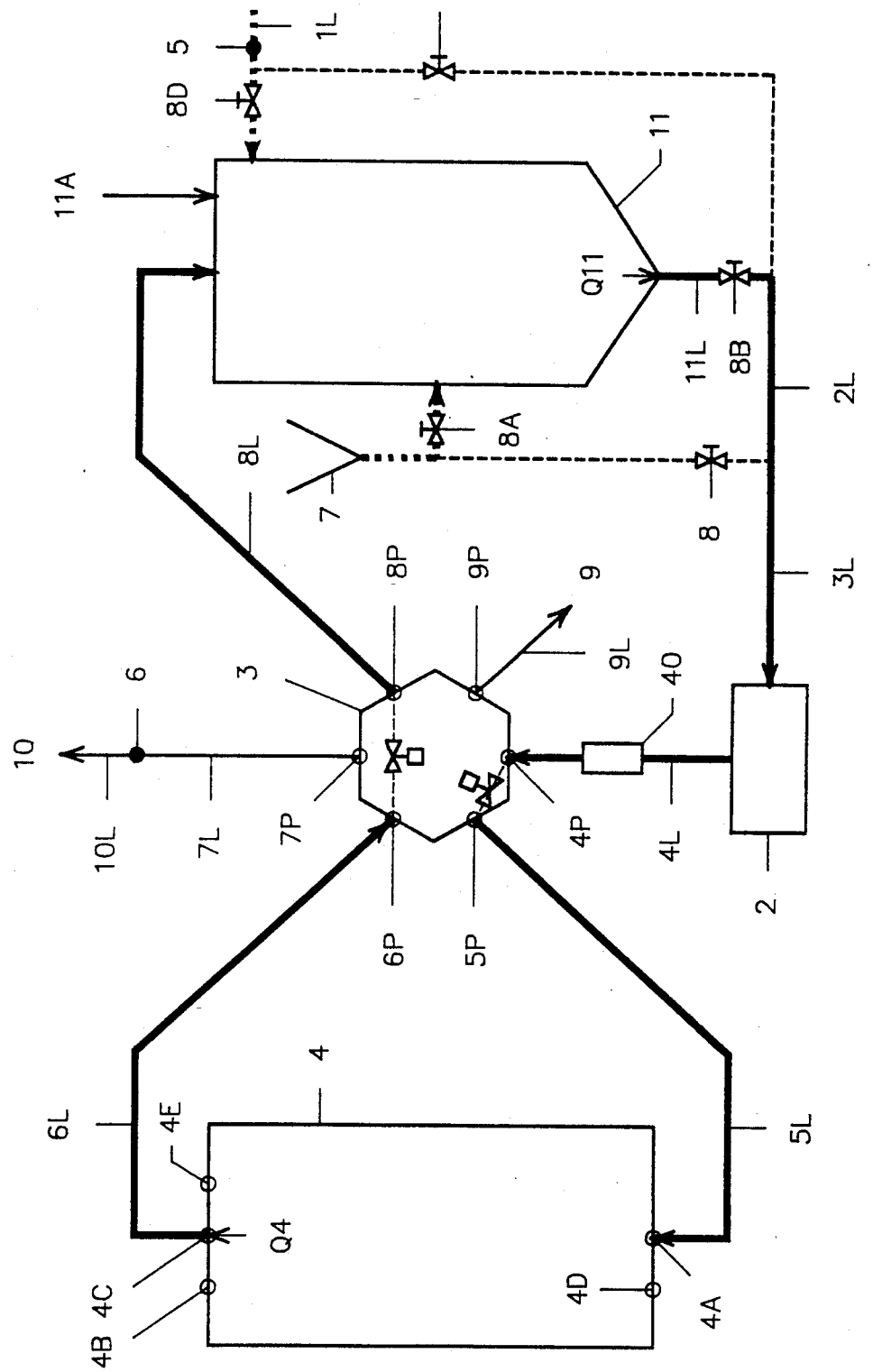

Referring to FIG. 7, the central flow control means 3 receives the effluent Q11 from process tank 11, through pipes 11L, 2L, 3L, 4L and pump 2, discharges said process tank effluent Q11 to said pressure filter 4 through normal filter inlet 4A for regeneration of filter medium, and then receives the pressure filter effluent Q4 for recirculation to said process tank 11 during the recirculation mode of operation. When operating said apparatus at recirculation mode by pumping and dialing the central flow control means 3 to "recirculation/precoat I," (not shown) but not pushing the precoat I button (not shown), the on-off ports 7P and 9P connecting to said liquid discharge pipe 7L and waste drain 9L, respectively, are closed, and the remaining ports 4P, 5P, 6P and 8P are open.

Referring to FIG. 8, when applicable, the central flow control means 3 receives both said process tank effluent Q11 and the precoat slurry Q7 for precoating said pressure filter 4 during the precoat mode of operation. The pressure filter effluent Q4 returns to said process tank 11 through said central flow control means 3. Both the influent liquid Q1 and the precoat slurry Q7, will be shut-off when there are enough liquid and precoat for the precoating operation. When operating said apparatus at said precoat mode by pumping, pushing the precoat button (not shown), and dialing the central flow control means 3 to "recirculation/precoat" (not shown), the on-off ports 7P and 9P connecting to said liquid discharge pipe 7L and said waste drain 9L, respectively, are closed, and the remaining on-off ports 4P, 5P, 6P and 8P are open, when the filter media slurry is being recirculated through said pump 2, central flow control means 3, pressure filter 4, central flow control means 3, and process tank 11, for precoating said filter media onto said pressure filter 4.

Figure 9:
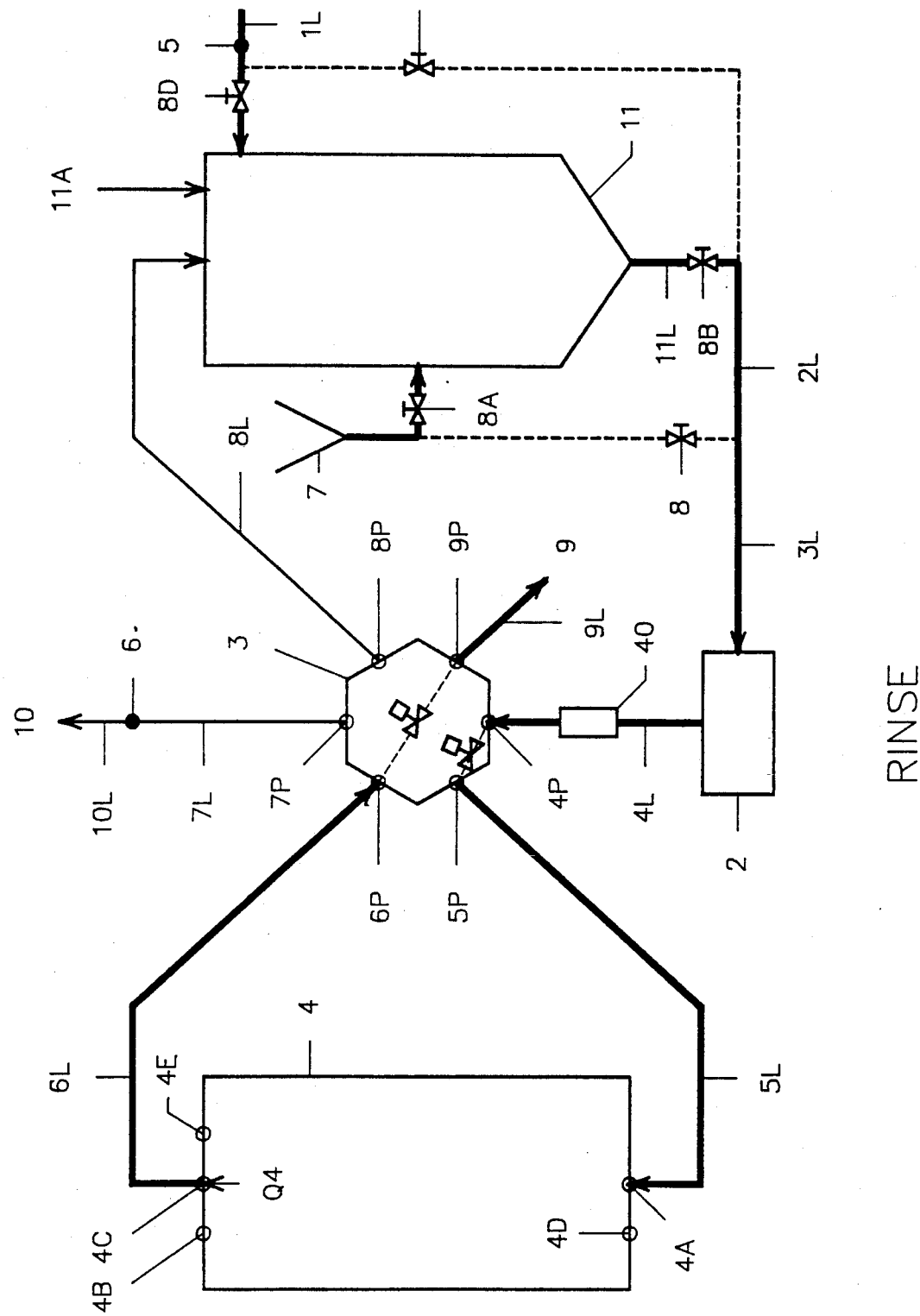

Referring to FIG. 9, when applicable, the central flow control means 3 receives said influent liquid Q1, discharges it to said pressure filter 4 for rinsing its filter media and wasting the rinse water Q4 from said pressure filter 4 to said waste drain 9L, during the rinse mode of operation. When operating said apparatus at rinse (purging) mode by pumping and dialing the central flow control to "rinse/desorption" (not shown), but not pushing the desorption button (not shown), the on-off ports 7P and 8P connecting to said liquid discharge pipe 7L and process tank 11, respectively, are closed, and all remaining ports 4P, 5P, 6P and 9P of said central flow control means 3 are open, when the on-off valve 8 of chemical feeder means 7 is closed.

Referring to FIG. 10 for said desorption mode of operation, when applicable, the pump 2 stops pumping and the central flow control means 3 is dialed to "rinse/desorption" mode (not shown), and a desorption button (not shown) is pushed, allowing the on-off ports 7P, 8P, 5P, and 4P, connecting to said second effluent discharge pipe 7L, said process tank 11, said pressure filter 4 entrance, and said pump 2, respectively, to be closed, and the remaining ports 6P and 9P of said central flow control means 3 to be open, for initially discharging the residual water inside said pressure filter 4, subsequently desorbing (regenerating) the reactive filter media 4F using compressed gas 12 and finally purifying the emitted gas from said pressure filter 4 using an air emission control means 14 (FIG. 10). Said air emission control means 14 in FIG. 10 is a tank 14 shown in FIG. 11 and comprises said waste drain pipe 9L leading said residual water and said emitted gas into said air emission control means: three prescreens 45, 46, and 47 for preliminary gas purification, a demister pad 22 for removal of moisture from said emitted gas 9G, a venturi gas dilution means 4D for diluting said emitted gas 9G, a gas mover 23 for moving said emitted gas 9G, an inlet gas sampling port 24 for sampling and analysis, an adsorber 25 for gas purification, an outlet gas sampling port 26 for sampling and analysis, and two liquid outlets 29A and 29B. In desorption operation, initially, the residual water inside said pressure filter 4 is discharged to said air emission control means 14 via said waste drain 9L by compressed gas 12 (FIG. 10), and can be collected as a wastewater 9 (FIG. 11). Subsequently compressed gas 12 desorbs volatile organic compounds (VOCs) and radioactive radon from the VOCs and radon impregnated spent adsorbent (GAC, PA etc.) inside said pressure filter 4, and flows to said air emission control means 14, where a valve 41 is open, a valve 42 is closed, and the emitted gas 9G containing VOCs and radon passes through said prescreens 45, 46, and 47, said gas outlet 21, said valve 41, and said demister pad 22 for reduction of humidity, and through said adsorber 25 for reduction of VOCs and radon. The inlet gas sampling port 24 and the outlet gas sampling port 26 are for gas sampling, in turn, for determining the gas purification efficiency of said adsorber 25. If the purified gas effluent 12A from said adsorber 25 meets the air quality standards, the purified gas effluent 12A is discharged to ambient air.

Alternatively, said valve 41 and said valve 42 shown in FIG. 12 are closed and open, respectively, and the emitted gas 9G passes through said prescreens 45, 46, and 47, said gas outlet 21, said gas mover 23 and said venturi dilution means 40 for the purpose of dilution, so the purified gas effluent 44 will meet the air quality standards. A set of said prescreens 45, 46, and 47 placed before said gas mover 23 is optional. Said prescreen 45 comprises coalescing filter modules. Said prescreens 46 and 47 comprise fiberglass filter, fibrous activated carbon filter, hydrophobic reticulate foam, hydrophilic reticulate foam, or combinations thereof. The air emission control means 14 of this invention is also effectively applied to other air pollution control applications, such as purification of contaminated air stream from a commercial kitchen.

Still alternatively, said venturi dilution means 40 and said valve 42 can be installed at a valve 4E of said pressure filter 4 (FIGS. 1A, 1B, 1C, 1D, 1G, and 1I, for example) for a simplified desorption operation, so the air emission control means 14 may be idled.

Still alternatively, said venturi dilution means 40 may be installed after said adsorber 25 for dilution of said purified gas effluent 12A shown in FIG. 11.

In the case of the present invention, many conventional flow control valves for operation of said pressure filter 4 and said process tank 11 are eliminated and replaced by one central flow control means 3, while at the same time, various modes of filtration operation are easily controlled by dialing. Various liquid filtration applications are achieved by proper selection of reactive/regenerative filter media and regeneration chemicals.

The simplification of the improved liquid filtration operation is accomplished by taking advantage of multiple on-off ports (not shown) inside of said central flow control means 3. By dialing a selected mode of operation which is marked on said central flow control means 3, only the applicable ports will be open, and the remaining non-applicable ports will be blocked simultaneously, thus directing the liquid to a proper treatment unit or pipe for treatment, processing or discharge.

More than one said central flow control means 3 can be adapted if multiple modules of said apparatus together with pretreatment means 5 and 7 or post-treatment means 6 are required.

The improvement of liquid treatment efficiency is accomplished by taking advantage of multiple reactive granular filter media 4F inside of said pressure filter 4. By choosing one or more feasible filter media and feasible filter aids, only the target contaminants are to be efficiently and selectively removed from said influent liquid Q1. Thus, the liquid treatment goal can be achieved at an affordable cost.

The present invention provided by the inventors is designed to maximize the treatment efficiency while to minimize the operation effort, so the small municipalities, institutions, single families, or even individuals adopt said apparatus for water purification, effluent treatment, or special liquid purification.

In most applications of the apparatus, the influent liquid Q1 is pumped to the apparatus at a velocity sufficient to ensure that liquid entering the apparatus system will flow through the center flow control means 3 and other treatment units or pipes as described. Thus, it is intended that the apparatus will ordinarily take advantage of the relatively high energy level imported to the liquid by pumping equipment from a pump 2.

Also, it should be noted that the process tank 11 is essential only if the filter media regeneration (including filter precoat) or chemical flocculation is intended. In the event that filter media regeneration or chemical flocculation is not intended, the process tank 11 is idled.

For a simplified liquid filtration operation in a residential building, the filter septum (filter element) 4S as well as the reactive filter media 4F in said pressure filter 4 can be of disposal type for the ease of operation and management. Normally, the filter septum 4S of this invention is porous plastic medium, porous stainless steel medium, or porous ceramic medium. The disposal type of the filter septum used in the present invention is of porous fiberglass medium, porous paper medium, porous carbon medium, or combinations thereof. The filter septum 4S can also be operated alone for filtration without any reactive or non-reactive granular filter media 4F.

For continuous filtration service, multiple pressure filters 4 may be adopted in the present invention. When one of the pressure filters is to be operated at an operational mode other than the filtration mode, the remaining pressure filter(s) can be operated in filtration mode for continuous service.

The apparatus of this invention is operated either manually using said central flow control means 3 or automatically using said same central flow control means 3.

Alternatively said central flow control means 3 is replaced by a group of solenoid valves or automatic control valves which receive the programmed electronic/electrical signals and are open or closed in accordance with the operator's instruction as follows:

Filtration Mode (FIG. 2)

Valve 4P-5P and valve 6P-7P are open. All other valves are closed.

Backwash Mode (FIG. 3)

Valve 4P-6P and valve 5P-9P are open. All other valves of said group are closed.

Bypass Mode (FIG. 4)

Valve 4P-7P is open. All other valves of said group are closed.

Flushing Mode (FIG. 5)

Valve 4P-9P is open. All other valves of said group are closed.

Preparation Mode (FIG. 6)

Valve 4P-8P is open. All other valves of said group are closed.

Recirculation Mode (FIG. 7)

Valve 4P-5P and valve 6P-8P are open. All other valves of said group are closed.

Precoat Mode (FIG. 8)

Valve 4P-5P and valve 6P-8P are open. All other valves of said group are closed.

Rinse Mode (FIG. 9)

Valve 4P-5P and valve 6P-9P are open. All other valves of said group are closed.

Desorption Mode (FIG. 10)

Valve 6P-9P is open. All other valves of said group are closed.

Finally, it should be noted that the process and apparatus provided by the present invention are used for removal of not only suspended particles, but also living microorganisms and soluble iron, manganese, heavy metals, hardness, volatile organic compounds, radioactive radon, and colloidal solids from contaminated river water, lake water, groundwater, domestic sewage, industrial process liquid, storm run-off and swimming pool water.

For various specific applications, certain means of this invention will be emphasized, and the remaining means of this invention may be de-emphasized, idled, or disconnected for cost savings.

For instance, for treatment of a highly contaminated water containing high concentrations of living, non-living, and radioactive contaminants, the apparatus of this invention comprising an ultraviolet pretreatment means, pump means, a chemical feed system, a process tank, a central flow control means, a pressure filter means, an ultraviolet post-treatment means, an air emission control means, and a piping system will be the most ideal filtration apparatus.

When treating a groundwater contaminated by pathogenic bacteria, soluble metals and low concentrations of radioactive radon gas, all water treating means identified in the above paragraph will still be needed; however, the process tank can be simply a tank (without mixing, flocculating and solid-water separating means), and the air emission control means can comprise simply a tank, a gas mover and a venturi gas dilution means (without prescreens and/or an adsorber).

If a heavily contaminated water contains no radioactive radon gas and volatile organic compounds, entire air emission control means of this invention can be idled or disconnected for cost saving although all other water treating means are still required.

In case the apparatus and the process of this invention are to be applied to further purification of tap water in a single family home, many water treating means, such as said chemical feed system, control means, process tank, and pump means are already provided by a municipal water treatment plant, thus are not needed again. A standby pump, however, is installed as a part of the present invention's apparatus in case the water pressure in said influent liquid pipe occasionally is not sufficiently high to move said liquid throughout entire apparatus. The remaining water treating means (such as said piping system, said ultraviolet pretreatment and/or post-treatment means, and at least one pressure filter means) are essential for household water treatment applications. The membrane filter media can also be adopted as one of filter media to be used in said pressure filter means.

The present invention is also very suitable for purifying process water in small commercial and industrial operations, such as automobile washing and glass cutting. Under such condition, special emphasis is placed on application of said chemical feed system, complete process tank (comprising means for chemical mixing, water flocculation, solid-water separation, and waste sludge discharge), said pump means, at least one pressure filter means, said ultraviolet post-treatment means, and the piping system. Besides, the filter media or filter cartridges inside said pressure filter means are either disposal type, requiring no backwash and regeneration, or permanent type, requiring off-site regeneration. As discussed previously, said process tank is to be operated as a sequencing batch sedimentation reactor, or a sequencing batch flotation reactor, or a sequencing batch exchanger reactor (U.S. Pat. application Ser. No. 07/871041; filed Apr. 20, 1992 by Wang et al), or as a conventional flocculation-sedimentation reactor. The present invention described here for small commercial and industrial operations treats the contaminated process water for reuse, and produces no wastewater, except a small quantity of solid waste, such as the disposal type of filter cartridge or filter media.

When treating contaminated water from large commercial and industrial installations, a complete process and apparatus of this invention will be required. The filter media will be backwashed and regenerated periodically. The wastewater and waste sludges produced from the present invention are to be discharged into a municipal sewer system for disposal.

What we claim as our invention is:

1. A filtration method for removing contaminants from a contaminated liquid comprising the following steps:
   (a) operating an apparatus comprising an influent liquid pipe, effluent discharge pipes, a waste drain, process pipes, an ultraviolet pretreatment means, a chemical feed system, a pump means, a process tank, a pressure filter means including reactive and non-reactive filter media and at least one filter septum, an ultraviolet post-treatment means, and a central flow control means in a filtration mode,
   (b) pumping the contaminated liquid to said influent liquid pipe of said apparatus,
   (c) disinfecting the contaminated liquid by said ultraviolet pretreatment means, as needed, producing an ultraviolet pretreated liquid, and discharging said ultraviolet pretreated liquid to either said process tank or a process pipe connected to said ultraviolet pretreatment means,
   (d) feeding a chemical, as needed, to the ultraviolet pretreated liquid in said process tank or a process pipe using said chemical feed system for chemical pretreatment and thereby producing an ultraviolet pretreated liquid, or a chemical pretreated liquid, or both,
   (e) pumping the ultraviolet pretreated liquid, or the chemical pretreated liquid, or both to said central flow control means and pressure filter means which comprises said filter media and at least one filter septum,
   (f) filtering the ultraviolet pretreated liquid, or the chemical pretreated liquid, or both by said filter media supported by said filter septum inside said pressure filter means for removal of suspended, dissolved, radioactive, living and non-living contaminants, and producing a filter effluent,
   (g) periodically discharging a concentrate produced inside said pressure filter means though an on/off valve during a prolonged filtration operation, and periodically discharging a waste sludge produced inside said process tank,
   (h) discharging the filter effluent from said pressure filter means through said central flow control means to said effluent discharge pipe where the filter effluent is treated by the ultraviolet post-treatment means, and producing a post-treated effluent or a product liquid,
   (i) periodically turning said central flow control means manually or automatically from said filtration mode to a backwash mode, for backwashing said pressure filter means at a liquid flow direction opposite to that of the filtration mode using the ultraviolet pretreated liquid or the chemical pretreated liquid or both and thereby producing, then discharging a backwash wastewater from said pressure filter and said central flow control means to said waste drain for disposal,
   (j) turning said central flow control means manually or automatically to a rinse mode, for rinsing said pressure filter means at a liquid flow direction identical to that of the filtration mode with said ultraviolet pretreated liquid or chemical pretreated liquid, or both and thereby producing, then discharging a rinse wastewater from said pressure filter means and said central flow control means to said waste drain for disposal, (k) turning said central flow control means manually or automatically from said rinse mode to the filtration mode again for filtering, thereby producing another filter effluent and another concentrate, and repeating steps (a) through (h), (l) turning said central flow control means manually or automatically to a bypass mode, allowing the ultraviolet pretreated liquid to bypass said pressure filter means and to be post-treated by said ultraviolet post-treatment means for producing a non-filtered but disinfected product liquid, (m) periodically turning said central flow control means manually or automatically to a flushing mode, for flushing the influent liquid pipe and the ports of said central flow control means and thereby producing, then discharging a flushing wastewater to said waste drain for disposal, (n) manually or automatically turning said central flow control means to a preparation mode, for preparing a chemical solution in said process tank, using said contaminated liquid and chemical from said chemical feed system, (o) turning said central flow control means manually or automatically to a recirculation mode, for recycling said chemical solution throughout the entire apparatus comprising said pump means, said chemical feed system, said central flow control means, said pressure filter means, said process tank, and said piping system to regenerate said filter media without discharging said product liquid and said wastewater, (p) turning said central flow control means manually or automatically to a precoat mode, for precoating said filter septum with said reactive granular filter media inside said pressure filter means by recirculation of the effluent of said process tank and said filter media from said chemical feed system, (q) turning said central flow control means manually or automatically to a desorption mode, for removing a residual water, regenerating said reactive filter media inside said pressure filter means and thereby producing an emitted gas effluent all using a gas compressor means, and for purifying said emitted gas effluent using an air emission control means comprising a tank, at least one prescreen, a gas mover, a venturi dilution means, a demister, an adsorber, valves, and pipes, and (r) turning said central flow control means manually or automatically from either said precoat mode or said desorption mode to the rinse mode for rinsing and then to the filtration mode for filtering and thereby continuously producing the product liquid.

2. Method as claimed in claim 1, wherein said pressure filter means is completely sealed and has means for operating said pressure filter means as a crossflow filter with or without rotating flow, a crossflow filter with or without elastic monofilament sleeve, a crossflow filter with downflow, a crossflow filter with upflow, a cross flow filter with horizontal flow a crossflow filter with or without precoat, a conventional filter with upflow, or a conventional filter with downflow.

3. The method of claim 1, wherein said process tank is operated as a sequencing batch sedimentation reactor, a sequencing batch flotation reactor, a continuous flocculation-sedimentation clarifier, or a continuous flocculation-flotation clarifier.

4. A liquid filtration apparatus comprising:

(a) a complete piping system comprising an influent liquid pipe, effluent discharge pipes, a waste drain, and process pipes; said influent liquid pipe leading a contaminated liquid into the apparatus, (b) an ultraviolet pretreatment means connected to said influent liquid pipe of said piping system, for treating the contaminated liquid and producing an ultraviolet pretreated liquid, (c) a chemical feed system connected to said piping system and a process tank arranged for selectively feeding a chemical to precoat a filter septum inside a pressure filter means containing reactive and non-reactive filter media, or regenerating said reactive filter media inside said pressure filter means with a regenerating chemical, or chemically treating the ultraviolet pre-treated liquid with ozone or chlorine or flocculants, and thereby producing a chemical pretreated liquid, (d) a pump means connected to said piping system downstream of said chemical feed system for providing energy to move the ultraviolet pretreated liquid, or chemical pretreated liquid, or both throughout the entire apparatus, (e) a central flow control means connected to said piping system downstream of said pump means, and comprising means for selecting a mode of apparatus operation, and directing a body of said pretreated liquid from the pump means to proper flow direction, (f) said pressure filter means connected to said piping system and said central flow control means, containing both the filter and the reactive and non-reactive filter media for purifying the ultraviolet pretreated liquid, or chemical pretreated liquid, or both from said central flow control means, (g) said process tank connected to said piping system and said central flow control means for mixing, preparing or storing said regenerating chemical or filter aids including said filter media of granular type, or flocculating chemical, for regenerating said filter media with said regenerating chemical, or for precoating the filter septum with said filter aids inside said pressure filter means, and for flocculating and clarifying said ultraviolet pretreated liquid inside said process tank, respectively, thereby producing said chemical pretreated liquid and a waste sludge; said process tank further comprising means for mixing, flocculation, solid-water separation and waste sludge discharge, (h) a first effluent discharge pipe connected to said central flow control means for discharging an effluent liquid from said central flow control means, (i) said waste drain connected to said central flow control means for discharging a wastewater, or a residual water, (j) an ultraviolet post-treatment means connected to said first effluent discharge pipe for post-treating the effluent liquid from said central flow control means and producing a product liquid, (k) a second effluent discharge pipe connected to said ultraviolet post-treatment means for discharging the product liquid, (l) said process pipes of said piping system connecting the influent liquid pipe, said ultraviolet pretreatment means, said chemical feed system, said pump means, said central flow control means, said pressure filter means, said process tank, said ultraviolet post-treatment means, said first effluent discharge pipe, said second effluent discharge pipe, said waste drain and an air emission control means; said piping system further being equipped with flow meters, pressure gauges and safety valves, and (m) said air emission control means connected to said waste drain for purifying an emitted gas effluent from said pressure filter during a desorption step using a compressed gas; said air emission control means further comprising an inlet pipe and a first gas inlet for introducing a contaminated gas into said apparatus;

a tank connected to said inlet pipe and having a bottom, side walls, and a top thereof as an outside wall of said air emission control means;

liquid valves for discharging accumulated liquid inside said tank;

a prescreen means for preliminary filtering said contaminated gas, thereby producing a prescreened gas; said prescreen means further comprising a coalescing filter screen, a fiberglass filter screen, a fibrous activated carbon filter screen, or combinations thereof;

a gas mover connected to said tank for moving said prescreened gas;

a gas valve and a venturi gas dilution means connected to said gas mover for diluting said prescreened gas, thereby producing a diluted gas to be discharged into ambient air;

a gas sampling point connected to said gas mover for collecting said prescreened gas for analysis;

a demister connected to said gas mover for removing moisture from said prescreened gas;

an adsorber connected to said demister for removing volatile and radioactive contaminants from said prescreened gas and thereby producing an adsorber effluent; said adsorber further comprising a adsorption tank, a second gas inlet, a gas outlet, valves, pipes, and adsorbent which is selected from the group consisting of virgin granular activated carbon, virgin fibrous activated carbon, ion exchange resins, polymeric adsorbent, base treated activated carbon, aluminate treated activated carbon, base treated polymeric adsorbent, aluminate treated polymeric adsorbent, reticulated foam, fiberglass screen, fibrous activated carbon screen, coalescing filter screen, or combinations thereof; and said gas outlet connected to said adsorber for discharging said adsorber effluent to an ambient air environment.

5. Apparatus as claimed in claim 4, wherein said central flow control means comprises a wide-open inlet port, an on-off port to said pressure filter means, an on-off port from said pressure filter means, an on-off outlet port to said first effluent discharge pipe, an on-off port to said process tank, and an on-off outlet port to said waste drain, and is manually or automatically controllable for selecting a mode of operation.

6. The apparatus of claim 4, wherein said pressure filter is completely sealed and has means for packaging said pressure filter with disposable filter cartridges, replaceable filter bags, modular filters, drop-in filter bags, permanent filter septum, elastic monofilament sleeve, filter media, means for receiving and existing liquid, means for desorption, means for liquid distribution, means for concentrate discharge, or combinations thereof.

7. Apparatus as claimed in claim 4, wherein said filter septum is made of porous stainless steel, mild steel, plated steel, alloy, ceramic, glass, fiberglass, polyethylene, nylon, CPVC, PVC, polypropylene, or combinations thereof.

8. Apparatus as claimed in claim 4, wherein said reactive and non-reactive filter media of this invention is selected from the group comprising granular metal medium, manganese dioxide, diatomaceous earth, regular granular activated carbons, silver impregnated granular activated carbon, iodinated resin, granular activated alumina, cation exchange resins, anion exchange resins, green sand, neutralizing sand, silica sand, coal, polymeric adsorbent, reticulated foam, fibrous activated carbon, coalescing filter medium, or combinations thereof.

9. The apparatus of claim 4, wherein said granular filter media in said pressure filter means are precoated on the surface of said filter septum with more than one layer of media and with coarser media to be coated on the outside layer.

10. Apparatus as claimed in claim 4, wherein said chemical is potassium permanganate, sodium chloride, sodium iodide, an acid, a base, ozone, hypochlorite, chlorine, a filter aid, reactive granular filter media, diatomaceous earth, aluminum sulfate, aluminum chloride, ferric sulfate, ferric chloride, poly aluminum chloride, poly ferric chloride, sodium aluminate, calcium hydroxide, calcium oxide, polyelectrolyte, or combinations thereof.

11. The apparatus of claim 4, wherein said process tank is operated as a sequencing batch sedimentation reactor, a sequencing batch flotation reactor, a continuous flocculation-sedimentation clarifier, or a continuous flocculation-flotation clarifier.

12. The apparatus of claim 4 wherein said air emission control means can selectively be idled or disconnected.

13. The apparatus of claim 4 wherein said means for mixing, flocculation, solid-water separation, and waste sludge discharge in said process tank can selectively be disconnected and removed.

14. The apparatus of claim 4 wherein said pressure filter means is either a single filtration unit or a multiple filtration units, and has at least one filter septum.

15. The apparatus of claim 4 wherein said demister, said adsorber, or both can selectively be idled or disconnected.

16. A liquid filtration apparatus for household applications comprising:

(a) a complete piping system comprising an influent liquid pipe, effluent discharge pipes, and process pipes; said influent liquid pipe leading a contaminated liquid into the apparatus, (b) a pump means connected to said piping system for providing energy to move the contaminated liquid throughout entire apparatus when water pressure in said influent liquid pipe is not sufficiently high to move said contaminated liquid throughout the entire apparatus, (c) an ultraviolet pretreatment means connected to said piping system, for treating the contaminated liquid and producing an ultraviolet pretreated liquid, (d) at least one pressure filter means connected to said piping system and said ultraviolet pretreatment means, containing both a filter septum and a filter media; said filter media being of either disposal type requiring no backwash and regeneration, or permanent type requiring replacement for off-site regeneration, and comprising granular activated carbon, ion exchange resins, polymeric adsorbents, membrane filter media, porous activated carbon, fibrous activated carbon, fiberglass filter media, or combinations thereof for purifying the ultraviolet pretreated liquid from said ultraviolet pretreatment means (e) a first effluent discharge pipe connected to said pressure filter means for discharging an effluent liquid from said pressure filter means, (f) an ultraviolet post-treatment means connected to said first effluent discharge pipe for post-treating the effluent liquid from said pressure filter means and producing a product liquid, (g) a second effluent discharge pipe connected to said ultraviolet post-treatment means for discharging the product liquid, and (h) said process pipes of said piping system connecting the influent liquid pipe, said ultraviolet pretreatment means, said pump means, said pressure filter means, said ultraviolet post-treatment means, said first effluent discharge pipe, and said second effluent discharge pipe; said piping system further equipped with flow meters, pressure gauges and safety valves.

17. A liquid filtration apparatus for small commercial and industrial operations comprising:

(a) a complete piping system comprising an influent liquid pipe, effluent discharge pipes, a waste drain, and process pipes; said influent liquid pipe leading a contaminated liquid into a process tank of the apparatus, an ultraviolet pretreatment means connected to said piping system for treating the contaminated liquid and producing an ultraviolet pretreated liquid, (b) at least one pump means connected to said piping system for providing energy to move the contaminated liquid throughout the entire apparatus, (c) a chemical feed system connected to said piping system and said process tank for feeding chemical to said contaminated liquid inside said process tank or said piping system, (d) said process tank connected to said piping system and said chemical feed system for mixing said chemical, flocculating and clarifying said contaminated liquid, and separating solids from said contaminated liquid inside said process tank, thereby producing a chemical pretreated liquid and a waste sludge, (e) at least one pressure filter means connected to said piping system and said ultraviolet pretreatment means, containing both a filter septum and a filter media; said filter media being of either disposal type requiring no backwash and regeneration, or permanent type requiring replacement for off-site regeneration, and comprising granular activated carbon, ion exchange resins, polymeric adsorbents, membrane filter media, porous activated carbon, fibrous activated carbon, fiberglass filter media, or combinations thereof for purifying the chemical pretreated liquid from said process tank, (f) a first effluent discharge pipe connected to said pressure filter means for discharging an effluent liquid from said pressure filter means, (g) an ultraviolet post-treatment means connected to said first effluent discharge pipe for post-treating the effluent liquid from said pressure filter means and thereby producing a product liquid, (h) a second effluent discharge pipe connected to said ultraviolet post-treatment means for discharging the product liquid, (i) said process pipes of said piping system connecting the influent liquid pipe, said ultraviolet pretreatment means, said chemical feed system, said pump means, said pressure filter means, said process tank, said ultraviolet post-treatment means, said first effluent discharge pipe, and said second effluent discharge pipe; said piping system further equipped with flow meters, pressure gauges and safety valves, and (j) means for discharging said waste sludge from said process tank.

18. A liquid filtration apparatus for household applications comprising:

(a) a complete piping system comprising an influent liquid pipe, effluent discharge pipes, and process pipes; said influent liquid pipe leading a contaminated liquid into the apparatus, (b) a pump means connected to said piping system for providing energy to move the contaminated liquid throughout entire apparatus when water pressure in said influent liquid pipe is not sufficiently high to move said contaminated liquid throughout the entire apparatus, (c) an ultraviolet pretreatment means connected to said piping system, for treating the contaminated liquid and producing an ultraviolet pretreated liquid, (d) at least one pressure filter means connected to said piping system and said ultraviolet pretreatment means, containing both a filter septum and a filter media; said filter media being of either disposal type requiring no backwash and regeneration, or permanent type requiring replacement for off-site regeneration, and comprising granular activated carbon, ion exchange resins, polymeric adsorbents, membrane filter media, porous activated carbon, fibrous activated carbon, fiberglass filter media, or combinations thereof for purifying the ultraviolet pretreated liquid from said ultraviolet pretreatment means; said pressure filter means further comprising a compressed gas inlet for desorbing said filter media, and an air emission control means for purifying an emitted gas from said pressure filter means, (e) a first effluent discharge pipe connected to said pressure filter means for discharging an effluent liquid from said pressure filter means, (f) an ultraviolet post-treatment means connected to said first effluent discharge pipe for post-treating the effluent liquid from said pressure filter means and producing a product liquid, (g) a second effluent discharge pipe connected to said ultraviolet post-treatment means for discharging the product liquid, (h) said process pipes of said piping system connecting the influent liquid pipe, said ultraviolet pretreatment means, said pump means, said pressure filter means, said ultraviolet post-treatment means, said first effluent discharge pipe, and said second effluent discharge pipe; said piping system further equipped with flow meters, pressure gauges and safety valves, and (i) said air emission control means comprising:

an inlet pipe and a first gas inlet for introducing a contaminated gas into said apparatus;

a tank connected to said inlet pipe and having a bottom, side walls, and a top thereof as an outside wall of said air emission control means;

liquid valves for discharging accumulated liquid inside said tank;

a prescreen means for preliminary filtering said contaminated gas, thereby producing a prescreened gas; said prescreen means further comprising a coalescing filter screen, a fiberglass filter screen, a fibrous activated carbon filter screen, or combination thereof;

a gas mover connected to said tank for moving said prescreened gas;

a gas valve and a venturi gas dilution means connected to said gas mover for diluting said prescreened gas, thereby producing a diluted gas to be discharged into ambient air;

a gas sampling point connected to said gas mover for collecting said prescreened gas for analysis;

a demister connected to said gas mover for removing moisture from said prescreened gas;

an adsorber connected to said demister for removing volatile and radioactive contaminants from said prescreened gas and thereby producing an adsorber effluent; said adsorber further comprising an adsorption tank, a second gas inlet, a gas outlet, valves, pipes, and adsorbent which is selected from the group consisting of virgin granular activated carbon, virgin fibrous activated carbon, ion exchange resins, polymeric adsorbent, base treated activated carbon, aluminate treated activated carbon, base treated polymeric adsorbent, aluminate treated polymeric adsorbent, reticulated foam, fiberglass screen, fibrous activated carbon screen, coalescing filter screen, or combinations thereof; and said gas outlet connected to said adsorber for discharging said adsorber effluent to an ambient air environment.

19. A liquid filtration apparatus for small commercial and industrial operations comprising:

(a) a complete piping system comprising an influent liquid pipe, effluent discharge pipes, a waste drain, and process pipes; said influent liquid pipe leading a contaminated liquid into a process tank of the apparatus, an ultraviolet pretreatment means connected to said piping system for treating the contaminated liquid and producing an ultraviolet pretreated liquid, (b) at least one pump means connected to said piping system for providing energy to move the contaminated liquid throughout the entire apparatus, (c) a chemical feed system connected to said piping system and said process tank for feeding chemical to said contaminated liquid inside said process tank or said piping system, (d) said process tank connected to said piping system and said chemical feed system for mixing said chemical, flocculating and clarifying said contaminated liquid, and separating solids from said contaminated liquid inside said process tank, thereby producing a chemical pretreated liquid and a waste sludge, (e) at least one pressure filter means connected to said piping system and said ultraviolet pretreatment means, containing both a filter septum and a filter media; said filter media being of either disposal type requiring no backwash and regeneration, or permanent type requiring replacement for off-site regeneration, and comprising granular activated carbon, ion exchange resins, polymeric adsorbents, membrane filter media, porous activated carbon, fibrous activated carbon, fiberglass filter media, or combinations thereof for purifying the chemical pretreated liquid from said process tank; said pressure filter means further comprising a compressed gas inlet for desorbing said filter media, and an air emission control means for purifying an emitted gas from said pressure filter means, (f) a first effluent discharge pipe connected to said pressure filter means for discharging an effluent liquid from said pressure filter means, (g) an ultraviolet post-treatment means connected to said first effluent discharge pipe for post-treating the effluent liquid from said pressure filter means and thereby producing a product liquid, (h) a second effluent discharge pipe connected to said ultraviolet post-treatment means for discharging the product liquid, (i) said process piping system connecting the influent liquid pipe, said ultraviolet pretreatment means, said chemical feed system, said pump means, said pressure filter means, said process tank, said ultraviolet post-treatment means, said first effluent discharge pipe, and said second effluent discharge pipe; said piping system further equipped with flow meters, pressure gauges and safety valves, (j) means for discharging said waste sludge from said process tank, and (k) said air emission control means comprising:

an inlet pipe and a first gas inlet for introducing a contaminated gas into said apparatus;

a tank connected to said inlet pipe and having a bottom, side walls, and a top thereof as an outside wall of said air emission control means;

liquid valves for discharging accumulated liquid inside said tank;

a prescreen means for preliminary filtering said contaminated gas, thereby producing a prescreened gas; said prescreen means further comprising coalescing filter screen, a fiberglass filter screen, a fibrous activated carbon filter screen, or combinations thereof;

a gas mover connected to said tank for moving said prescreened gas, a gas valve and a venturi gas dilution means connected to said gas mover for diluting said prescreened gas, thereby producing a diluted gas to be discharged into ambient air;

a gas sampling point connected to said gas mover for collecting said prescreened gas for analysis;

a demister connected to said gas mover for removing moisture from said prescreened gas;

an adsorber connected to said demister for removing volatile and radioactive contaminants from said prescreened gas and thereby producing an adsorber effluent; said adsorber further comprising an adsorption tank, a second gas inlet, a gas outlet, valves, pipes, and adsorbent which is selected from the group consisting of virgin granular activated carbon, virgin fibrous activated carbon, ion exchange resins, polymeric adsorbent, base treated activated carbon, aluminate treated activated carbon, base treated polymeric adsorbent, aluminate treated polymeric adsorbent, reticulated foam, fiberglass screen, fibrous activated carbon screen, coalescing filter screen, or combinations thereof; and said gas outlet connected to said adsorber for discharging said adsorber effluent to an ambient air environment.

* * * * *